United States Patent
Tan

(10) Patent No.: US 11,450,232 B2
(45) Date of Patent: Sep. 20, 2022

(54) CODE-SWITCHING OF BLENDED MULTILINGUAL CONTENT

(71) Applicant: Transcendent International, LLC., New York, NY (US)

(72) Inventor: William Z. Tan, New York, NY (US)

(73) Assignee: Transcendent International, LLC, New York, NY (US)

( * ) Notice: Subject to any disclaimer, the term of this patent is extended or adjusted under 35 U.S.C. 154(b) by 464 days.

(21) Appl. No.: 16/244,634

(22) Filed: Jan. 10, 2019

(65) Prior Publication Data
US 2019/0213915 A1 Jul. 11, 2019

Related U.S. Application Data

(60) Provisional application No. 62/615,739, filed on Jan. 10, 2018.

(51) Int. Cl.
| | |
|---|---|
| *G06F 40/42* | (2020.01) |
| *G09B 19/06* | (2006.01) |
| *G09B 5/06* | (2006.01) |
| *G06F 40/58* | (2020.01) |
| *G06F 40/205* | (2020.01) |
| *G06F 40/289* | (2020.01) |

(52) U.S. Cl.
CPC .......... *G09B 19/06* (2013.01); *G06F 40/205* (2020.01); *G06F 40/289* (2020.01); *G06F 40/42* (2020.01); *G06F 40/58* (2020.01); *G09B 5/065* (2013.01)

(58) Field of Classification Search
CPC ................................ G06F 40/42; G06F 40/58
See application file for complete search history.

(56) References Cited

U.S. PATENT DOCUMENTS

| | | | |
|---|---|---|---|
| 9,959,271 B1* | 5/2018 | Goyal | G06F 40/51 |
| 2004/0122676 A1 | 6/2004 | Mejia | |
| 2011/0097693 A1 | 4/2011 | Crawford | |
| 2013/0143183 A1 | 6/2013 | Zilberman | |
| 2014/0038142 A1* | 2/2014 | Chang | G09B 5/06 |
| | | | 434/156 |
| 2014/0272885 A1* | 9/2014 | Allen | G09B 7/02 |
| | | | 434/322 |
| 2015/0004587 A1 | 1/2015 | Rozycki et al. | |

(Continued)

FOREIGN PATENT DOCUMENTS

WO    WO2009011831    1/2009

OTHER PUBLICATIONS

International Search Report for PCT/US2019/013027 dated Mar. 27, 2019, 14 pages.

(Continued)

*Primary Examiner* — Omkar A Deodhar
(74) *Attorney, Agent, or Firm* — Lowenstein Sandler LLP

(57) ABSTRACT

An electronic platform to generate and display blended multilingual content. The methods and systems can be employed in an educational environment to assist a user fluent in a native language in learning a target language. One or more blended combinations of content in the native language and the target language are generated and displayed to the user. A machine learning component can be used to evaluate performance data to execute adjusts to the level and type of blending applied to the blended combinations to increase and improve learning efficiency.

20 Claims, 21 Drawing Sheets

(56) References Cited

U.S. PATENT DOCUMENTS

2016/0027333 A1* 1/2016 Labutov ................. G06F 40/40
  434/157
2016/0300502 A1* 10/2016 Dudek .................... G09B 7/04
2017/0186338 A1*  6/2017 Treves .................... G09B 7/02

OTHER PUBLICATIONS

PCT Notification of Transmittal of The International Preliminary Report and The Written Opinion of The International Searching Authority for PCT Application No. PCT/US2019/013027, dated Jul. 14, 2020, 9 pages.

* cited by examiner

FIG. 3

| Content in the native language (L1) | Content in the target language (L2) |
|---|---|
| One day, the Minimities... | Un dia, los Minimities... |
| Hello, Abuelita | ¡Hola Abuelita |
| Cesar greeted | Cesar le saludó |
| Hi | ¡Hola |
| Mei greeted | Mei le saludó |
| Hello kids | Hola chicos |
| Abuelita greeted | Abuelita les saludó |
| ... | ... |

|        | El | primer | cerdito | vio | un | atado | de | paja |
|--------|----|--------|---------|-----|-----|-------|-----|------|
| The    | X  |        |         |     |     |       |     |      |
| first  |    | X      |         |     |     |       |     |      |
| little |    |        | X       |     |     |       |     |      |
| pig    |    |        | X       |     |     |       |     |      |
| saw    |    |        |         | X   |     |       |     |      |
| a      |    |        |         |     | X   |       |     |      |
| bundle |    |        |         |     |     | X     |     |      |
| of     |    |        |         |     |     |       | X   |      |
| straw  |    |        |         |     |     |       |     | X    |

FIG. 4C

| English Phrase | Spanish Phrase |
|---|---|
| little pig | cerdito |
| the first | el primer |
| the first little pig | el primer cerdito |
| the first little pig saw | el primer cerdito vio |
| saw a bundle of straw | vio un atado de paja |
| a bundle of straw | un atado de paja |
| the | el |
| first | primer |
| saw | vio |
| a | un |
| bundle | atado |
| straw | paja |

| The first little pig | saw | a | bundle of | straw and | said: "I'll make | a | cozy | hut with | this | straw." |
|---|---|---|---|---|---|---|---|---|---|---|
| The second little pig | saw a | pile of | branches and | said: "I'll make | a | beautiful | cabin with | these | branches." |
| The third little pig | saw a | load of | bricks and | said: "I'll make | a | great | house with | these | bricks." |

| El primer cerdito | vio | un | atado de | paja y | dijo: "Voy a hacer | una | comoda | choza con | esta | paja". |
|---|---|---|---|---|---|---|---|---|---|---|
| El segundo cerdito | vio | un | monton de | ramas y | dijo: "Voy a hacer una | linda | cabana con | esta | ramas". |
| El tercer cerdito | vio | una | carga de | ladrillos y | dijo: "Voy a hacer una | gran | casa con | estos | ladrillos". |

FIG. 5

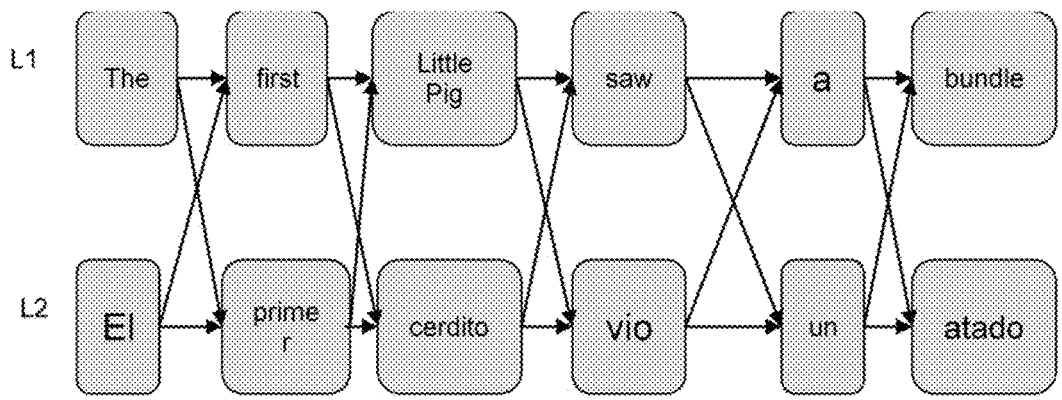

FIG. 6

Original English (L1): I brought some sweet potatoes to take with you
Original Spanish (L2): *Yo les traje unas batatas para las lleven con ustedes*

Blend 1) *Yo* brought some sweet potatoes to take with you
Blend 2) *Yo* brought *unas* sweet potatoes *para* take *con you*
Blend 3) *Yo* brought *unas* sweet potatoes *para* take *con ustedes*
Blend 4) *Yo les traje unas* sweet potatoes *para* take *con ustedes*
Blend 5) *Yo les traje unas* sweet potatoes *para las lleven con ustedes*

FIG. 10
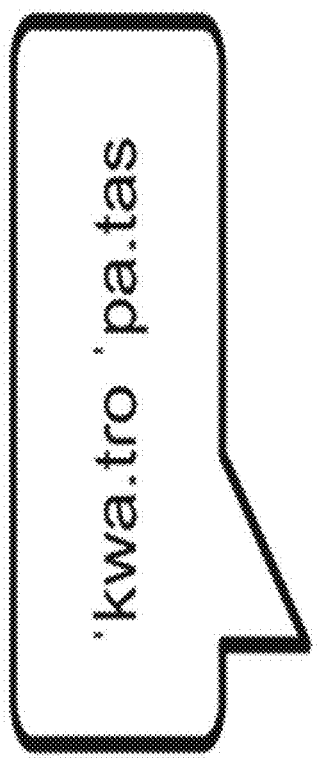
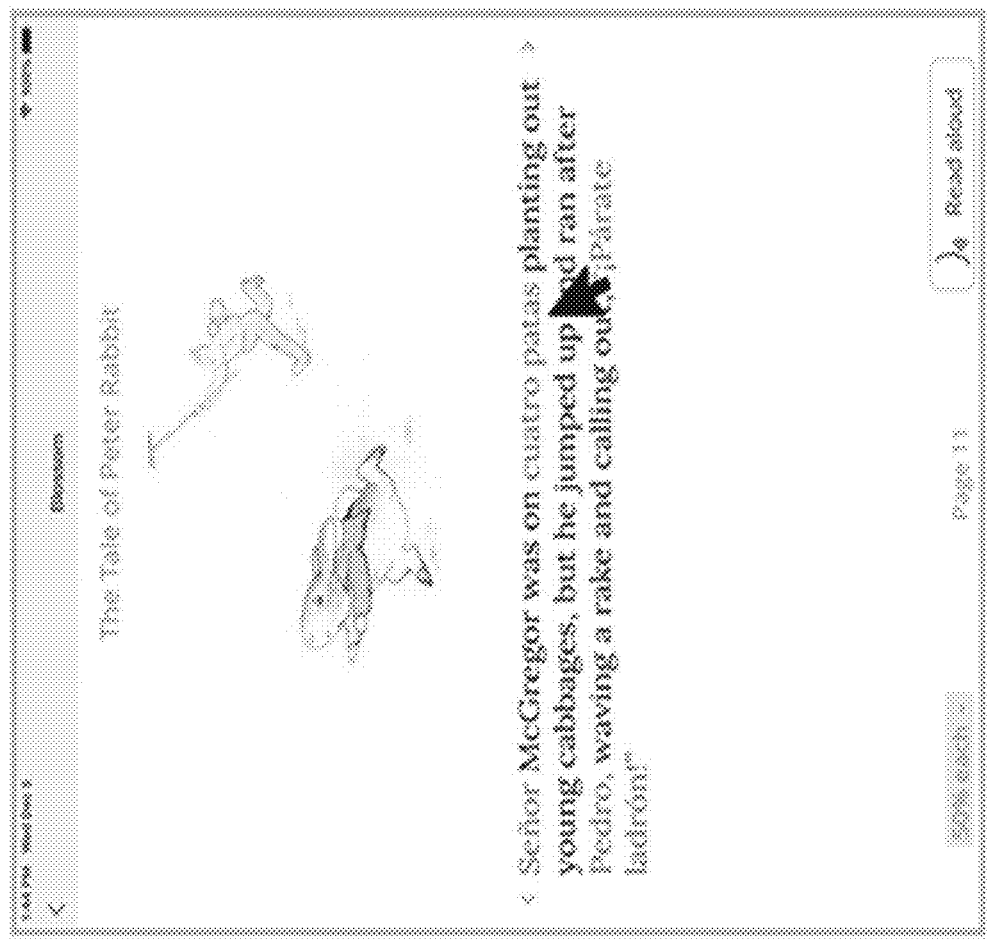

FIG. 13
Blossom Speech
Production: 30% native
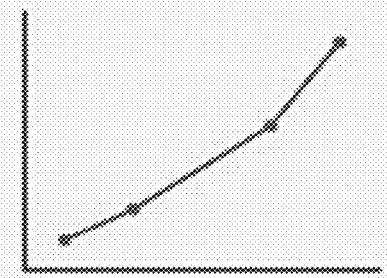
Your pronunciation has improved a lot lately — try practicing with the Blossom Speech Coach to keep it up!
Speech coach
Try saying this word — we'll highlight the sounds you should practice.
 perro
Accuracy: 60%
Not bad! Try again, focusing on these parts:
perro

FIG. 14A

FIG. 14B

CODE-SWITCHING OF BLENDED MULTILINGUAL CONTENT

CROSS-REFERENCE TO RELATED APPLICATION

This application claims the benefit of U.S. Provisional Application No. 62/615,739, filed Jan. 10, 2018, the entire disclosure of which is incorporated herein by reference.

TECHNICAL FIELD

The present disclosure generally relates to techniques for learning a foreign language and, more particularly, to systems and methods for code-switching of blended multilingual content.

BACKGROUND

Learning a foreign language is a difficult task for most people. Prevailing methods of language instruction are typically characterized by two main aspects, which include (i) learning with a teacher in a classroom both in formal and informal educational systems, and (ii) learning all four language skills simultaneously, e.g., listening, speaking, reading and writing. Conventionally, learning systems utilize a static lesson plan or classroom format, which is typically arranged in a predefined order. This format, however, ignores the individual needs of each student and forces the student to conform to a static method that may not fit their specific needs.

Furthermore, as language acquisition is at its most effective during the formative early-childhood years, parents and educators seek out a variety of resources such as bilingual storybooks for their young readers. Given the lack of innovation in the bilingual literacy space, parents who want to help their children learn another language either have to translate on the fly while they are reading or, if the book has side-by-side translations, read the same story twice in both languages. Neither is an effective, efficient, nor enjoyable option. Additionally, parents may not be fluent in the foreign language they wish for their children to learn, rendering even the best of intentions without an enabling outlet for implementation.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 3 illustrates an example native language input file and a corresponding target language input file, in accordance with one or more embodiments of the present disclosure.

FIG. 4C is an example representation of a chunking process corresponding to native language text and target language text, in accordance with one or more embodiments of the present disclosure.

FIG. 5 depicts an example code switching model including example transitions between first language native text and second language target text, in accordance with one or more embodiments of the present disclosure.

FIG. 6 depicts example blended sentences including portions of first language native text and second language target text, in accordance with one or more embodiments of the present disclosure.

FIGS. 8-10 illustrate example graphical user interfaces generated by the multilingual content management system, in accordance with one or more embodiments of the present disclosure.

FIG. 13 illustrates an example graphical user interface used to record a us pronunciation of certain words presented in a target language, in accordance with one or more embodiments of the present disclosure.

FIGS. 14A-14C depicts example graphical user interfaces presenting information relating to a user's progress associated with a multilingual content management system, in accordance with one or more embodiments of the present disclosure.

Figure 1:
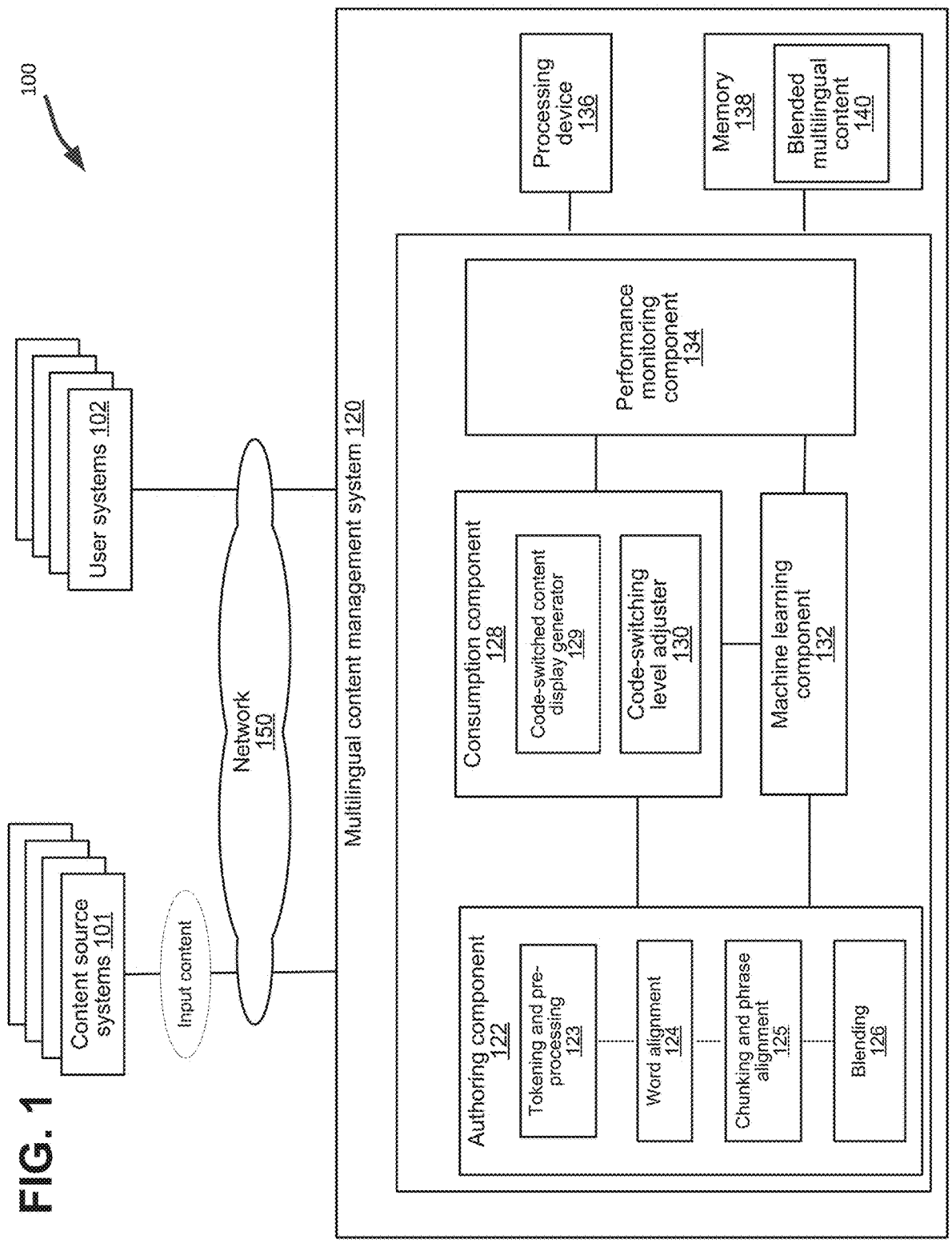
FIG. 1 illustrates an example multilingual content management system in an example computing environment, in accordance with one or more embodiments of the present disclosure.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to an electronic platform to generate and display blended multilingual content. Although aspects of the disclosure may be beneficial for certain electronic platforms, the techniques disclosed herein may be used with various types of systems. In one embodiment, a system (herein referred to as a "multilingual content management system") can be employed in an electronic learning (also referred to as "eLearning") environment including one or more content native systems and one or more end-user systems (also referred to as "user systems"). In an embodiment, the multilingual content management system is part of an eLearning environment configured to execute one or more methods where users (e.g., language learners, instructors, administrative staff) operating user systems engage in education related activities using operatively coupled computing devices. Electronic learning can be an individual activity where users may undertake self-directed study, such as studying an electronic textbook or watching a pre-recorded or live webcast. Materials used in eLearning may be provided in electronic formats so that they can be reproduced for virtually an unlimited number of users.

According to embodiments, methods and systems of the present disclosure utilize the electronic platform to deliver multilingual content in a user-scaled blend of a native language (also referred to as a first language or "L1") and a second non-native language (also referred to as a target language or "L2"). It is noted that, according to embodiments of the present disclosure, the terms "native" and "target" refer to a first language which is considered to be the base or native language of a user and a second language which is a target language which the user wishes to learn or improve his or her fluency. It is to be appreciated that any language can be established as either the native language or the target language, depending on the fluency and perspective of a user. In an embodiment, the multilingual content management system is configured to generate multilingual blended content including a blended combination of any two languages (e.g., a first language (L1) denoted as the "native language" and a second language (L2) denoted as the "target language"). In an embodiment, a user having a level of proficiency in a native language (e.g., the native language) can interact with the multilingual content management system to enable processes to assist in the learning of a non-native language (e.g., a target language). In an embodiment, the multilingual content management system manages content including, but not limited to, printed material (e.g., fiction, journal articles, written advertisements, etc.), multimedia (e.g., audio-visual programming such as podcasts, television or film, etc.), and interactive educational content (e.g., computer assisted language learning, childhood development programs, etc.). In an embodiment, the multilingual content management system provides for the authoring of content that algorithmically generates a graduated, code-switched text. In an embodiment, the code-switched text includes one or more blended or integrated combinations of the native language (L1) and the target language (L2) to produce code-switched L1:L2 text.

The multilingual content management system enables consumption of the authored content by users in a configurable manner such that a level or extent of the bilingual blend of the L1 and L2 text can be controlled (e.g., the blend level representing a ratio of the portion of L1 text to a portion of L2 text). The multilingual content management system further enables iterative enhancement of the consumed content that tracks on-screen interaction of a user (e.g., translation taps, page duration, responses to language-learning games, etc.) for an evaluation of the user's competency in the target non-native language and, in the case of early-childhood readers, overall literacy and biliteracy development.

Implementations of the present disclosure include processes for code-switched blended multi-lingual content. In an embodiment, code-switching processing includes alternating between two or more languages (e.g., L1 and L2) in the span of a linguistic utterance. According to embodiments, the multilingual content management system generates blends of a native language (L1) and a target language (L2) using one or more of natural language processing and machine learning processing. Advantageously, the multilingual content management system enables language learners to consume content (e.g., read and/or listen to) in a foreign or target language regardless of their existing level of knowledge of the target language. For example, the multilingual content management system provides a scaffold approach that gradually increases the proportion of L2 language in the blended content. In an embodiment, the graduated blends of the code-switched languages (L1 and L2) can include an audio pronunciation component to assist the user in learning words and phrases in the target language. In an embodiment, each time a user reads a content element (e.g., a story, a poem, an article, a saying, a chapter, a line, etc.), the code-switched text evolves through the gradual and optimized presentation of vocabulary in the target language L2 to provide a more supportive reading experience and enable the user's non-native language development.

Users may communicate with the multilingual content management system to create, translate, and consume electronic services, including electronic advertisement and educational courses. In an embodiment, the multilingual content management system can be part of or associated with a traditional "brick and mortar" educational or research institution (e.g., a grade school, university or college), another entity that provides educational services (e.g., an online university, a company that specializes in offering training courses, an organization that has a training department, etc.), a cultural or literacy promotion institution (e.g., a library, a museum, a non-profit organization dedicated to early childhood literacy, etc.), or may be an independent service provider (e.g., for providing individual eLearning).

FIG. 1 illustrates an electronic environment 100 including a multilingual content management system 120 operatively coupled to one or more content source systems 101 and one or more user systems 102. In an embodiment, the content source systems 101 include one or more computing devices operable by a content provider (e.g., a publisher, author, website, distributor, blogger, etc.) to provide input content to the multilingual content management system 120. In an embodiment, the user systems 102 include one or more computing devices operable by a user (e.g., a language learner, an educator, a parent, etc.) to access and consume the input content as processed by the multilingual content management system 120 in accordance with the methods described in detail herein.

According to embodiments, the content source systems 101 and the user systems 102 can include a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The content source systems 101 and the user systems 102 can include further components such as, for example, user input devices such as a keyboard and mouse and/or various other types of input devices such as pen-inputs, joysticks, buttons, touch screens, etc., and a display. The display can be configured to render one or more graphical user interfaces (GUIs) generated by the multilingual content management system 120. The display can include, for example, one or more devices such as liquid crystal displays (LCD), gas plasma-based flat panel displays, organic light emitting diode (OLED) displays, electrophoretic ink (E ink) displays, LCD projectors, or other types of display devices, etc.

The content source systems 101 and the user systems 102 can be operatively coupled to the multilingual content management system 120 via a network 150 using a web-enabled browser. In one embodiment, the network 150 may be any suitable network, including, for example, the Internet, intranets, extranets, wide area networks (WANs), local area networks (LANs), wired networks, wireless networks, etc., or any combination of two or more such networks. In some implementations, users can install an application and/or select a service in order to access the multilingual content management system 120. In an embodiment, the application can be downloaded and installed on one or more of the content source system 101 and the user system 102. For example, the users may select to download the application associated with the multilingual content management system 120 from a service associated with an online server. In an embodiment, the content source system 101 and the user system 102 can transmit a request for the application over a network and in response, receive the application from the service. The application may be installed locally on a device (e.g., a mobile device) of the content source systems 101 and/or the user systems 102. Alternatively, the application can be stored at the service remotely and may be accessed through a connected computing device, for example, via a web browser.

In some implementations, the multilingual content management system 120 includes one or more computing devices configured to provide an automated platform for the authoring, consumption, and analysis of the consumption of blended multilingual content. In an embodiment, the multilingual content management system 120 is configured to execute code-switching schemas (e.g., randomized, algorithmic or probabilistic). In an embodiment, the performance monitoring component 134 can track the code-switching schema type used in the creation of the code-switched content.

Each user of the system may be associated with a user account which may govern access permissions and set configurations for the user. For example, the user account may include one or more preferred languages for a user. The preferred languages may relate a language that the user consumes content in, a native language that the publisher translates content from (e.g. native L1 language), and a non-native language (e.g., L2 language) that the language learner (e.g., L2 language) intends to learn. In another example, the user account can record and maintain a list of vocabulary which the user has selected in the course of perusing an eBook or viewing a video or other multilingual content on a device in user system 102. In yet another example, the user account can maintain a list of the multilingual content which the user has perused, and can present a list of suggested multilingual content based on one or more criteria, such as multilingual content that includes the same words and phrases from the user's vocabulary list.

In one embodiment, the multilingual content management system 120 can include an authoring component 122, a consumption component 128, a machine learning component 132 and a performance monitoring component 134 configured to perform the operations and functions described in detail herein with regard to FIGS. 1-15. The multilingual content management system 120 can include one or more processing devices 136 to implement and/or execute components (e.g., the authoring component 122, the consumption component 128, the machine learning component 132, and the performance monitoring component 134) of the multilingual content management system 120 and a memory 140 to store data associated with the operations and functions of the multilingual content management system 120. In an embodiment, the components of the multilingual content management system 120 can include hardware, software, or a combination thereof configured to perform the tasks, operations, functions, programs, processes, etc. described in detail herein. It is noted that although various components are described herein, the multilingual content management system 120 can include any number of components configured to implement the processes and functionality described in detail with regard to FIGS. 1-15.

In an embodiment, the authoring component 122 can receive input content (e.g., from one or more content source systems 101). The input content can include one or more content items (e.g., one or more words, symbols, phrases, sentences, paragraphs, stories, chapters, books, images, audio components, etc.) in a native language (L1) and a target language (L2). In an embodiment, the authoring component 122 can receive the input content in a suitable file format (e.g., a text file, a PDF, etc.) including text in the native language (L1) and can generate corresponding text in one or more target languages (L2s).

In an embodiment, the authoring component 122 is configured to perform various functionality relating to the input content including tokening and pre-processing 123, word alignment 124, chunking and phrase alignment 125 and blending 126. In an embodiment, tokening and pre-processing 123 can include one or more operations to parse or split one or more sentences of the input content into words. In an embodiment, the tokening and pre-processing 123 confirms the file including the input content are encoded in a format for further processing by the authoring component 122, including the removal or stripping of unnecessary punctuation from the text of the input content. In an embodiment, the tokening and pre-processing 123 generates one or more files including text of the input content in the native language (L1) and a target language (L2) aligned at a sentence level, where each sentence is tokenized into words in both the L1 and L2 languages. In an embodiment, tokenization includes an NLP task involving the splitting of text into units (e.g., words, punctuation, etc.). In an embodiment, chunks and phrases are products of higher-level tasks such as parsing and word alignment. In an embodiment, phrases and chunks refer to groups of words. In an embodiment, a phrase can include a grammatical phrases (e.g., noun phrases) which are identified as a product of parsing, and a chunk can include any contiguous groups of words.

In an embodiment, the authoring component 122 can execute word alignment 124 which can include one or more operations to receive the tokenized text generated above and applies a word alignment technique to generate correspondences between words in L1 and L2. In an embodiment, the word alignment 124 can include the execution of a suitable multilingual sub-sentential aligner (e.g., word alignment) program or process, such as, for example, the Giza++ program, the Anymalign program, etc.).

In an embodiment, the authoring component 122 can execute chunking and phrase alignment 125 which can include one or more operations to generate groups, or chunks, of words, based on one or more of the following factors: 1) the grammar of L1, and 2) the contiguous phrases extracted from word alignment. With regard to the first factor (i.e., the grammar of L1), the chunks can include structures such as noun phrases (NPs), which can be treated grammatically as one unit. In an embodiment, the chunking and phrase alignment 125 process can be implemented using the output of a Parts-of-Speech tagging (POS tagging) process. It should be noted that not all languages have the same standards of what constitutes a part of speech, therefore, the standards for what constitutes an NP chunk can, in an embodiment, be based on a template language, such as English. In an embodiment, the chunking and phrase alignment 125 can be implemented by parsing, which identifies a hierarchy of groupings of words, or by shallow parsing, which is a simplified technique for parsing, such as those used in NLP applications.

In an embodiment, with regard to the second factor (i.e., extraction of contiguous phrases from word alignment), the chunking and phrase alignment 125 operations can use the output of the word alignment 124 to extract a list of contiguous phrase pairs (i.e., a sequence of words in L1 sentences that corresponds to a sequence of words in L2 sentences). In an embodiment, a phrase extraction algorithm, such as the example described by "Statistical Machine Translation" by Philipp Koehn, Cambridge University Press, 2009, can be employed.

In an embodiment, an output of a chunking process can include matched groups of words between L1 and L2 sentences. Advantageously, the chunking and phrase alignment 125 accommodates languages that have a high degree of similarity, in terms of the structure and word order, and also accommodates less similar language pairs because the basics of word alignment and chunking can be effectively implemented with any language pair, as evidenced by example Statistical Machine Translation approaches. In an embodiment, as a result of the chunking and phrase alignment 125, the text is structured in a way that shows the correspondence between words and phrases in L1 to their equivalents in L2.

In an embodiment, the authoring component can execute blending 126 which can include one or more operations to transform the output of word alignment 124 and chunking and phrase alignment 125 in a format that allows replacing any of the L1 chunks in a sentence with their corresponding L2 chunks. As described in greater detail below, in an embodiment, the blending 126 can include the presentation of and transitions between L1 and L2 in one or more of the following categories: 1) randomized: wherein switching between L1 and L2 can be performed at any point at random; 2) algorithmically: wherein switching between L1 and L2 can be performed in accordance with a set of blending rules (e.g., code-switching rules) governing the transitions (e.g., switch to L2 every other chunk, switch all nouns to L2, etc.); 3) probabilistically: wherein switching between L1 and L2 can be performed in accordance with probabilistic weights set for individual states (chunks) and for transitions between states. In an embodiment, the blending 126 can include the application of one or more code-switching rules to determine the blend of the L1 and L2 text (e.g., a blended sentence including a first portion in L1 text and second portion in L2 text).

In an embodiment, the consumption component 128 can generate and present blended multilingual content 140 to a user system 102. In an embodiment, the consumption component 128 includes a code-switched content display generator 129 and a code-switching level adjuster 130. In an embodiment, the code-switched content display generator 129 generates a display including a presentation of the blended multilingual content 140 ((generated by the authoring component 122) to the user system 102. In an embodiment, the presentation of the code-switched material can be represented by a Finite State Machine (FSM). In an embodiment, an initial set of code-switching parameters can be determined by the author via the authoring component 122. In an embodiment, the machine learning component 132, together with the performance monitoring component 134, can adjust one or more code-switching parameters (e.g., as applied by blending 126) based on the user's inputs and performance in comparison to similar users (e.g., other users in a user group).

In an embodiment, the code-switching level adjuster 130 is configured to receive one or more inputs from a user system that can be used to adjust a level or ratio of the code-switching corresponding to the code-switched content generated by the authoring component 122 and displayed by the code-switched content display generator 129. As described in greater detail below, the code-switching level can be adjusted based on one or more controllable parameters (herein referred to as "code-switching parameters"). In an embodiment, the code-switching parameters can be adjusted by a user system 102 (e.g., by a learner, an educator, etc.) and/or adjusted by a machine learning component 132. In an embodiment, the code-switching level is a ratio of the amount of text presented in the native language to the amount of text present in the target language (e.g., a blending level or ratio). In an embodiment, the code-switching level adjuster 130 can receive one or more inputs from the user system including a selection of a blending ratio from a set of multiple blending ration options.

In an embodiment, the machine learning component 132 is operatively coupled to a performance monitoring component 134 configured to track and collect data relating to user system performance associated with consumption of the multilingual blended content. In an embodiment, the collected data can include information representing interactions by the user system with the blended multilingual content 140 during consumption of the content. In an embodiment, the collected data can be used by the performance monitoring component 134 to determine a user's performance with respect to consumption (e.g., learning) of a target language (e.g., a score, a progress chart, trend analysis, proficiency measurements, etc.). In an embodiment, the performance monitoring component 134 collects and analyzes the information associated with the user systems' interactions to determine the performance data (e.g., interest or progress measurements). In an embodiment, the machine learning component 132 applies one or more machine learning algorithms based on the consumption measurements (e.g., the type of words or phrases most frequently switched by a user from L1 to L2, etc.) to identify adjustments to the code-switching parameters to improve the user systems' consumption of the code-switched content. In an embodiment, the machine learning component 132 includes one or more machine learning processes trained on data that is captured from user input/activities via an interface to feed back into the code-switching rules of the authoring component 122. In an embodiment, the machine learning component 132 can operatively couple with the authoring component 122 to change, update, modify, or adjust the blending type (e.g., randomized, algorithmic, and probabilistic blending types) applied in the blending 126 operations.

In an embodiment, the performance monitoring component 134 is configured to collect data associated with consumption of the blended multilingual content 140 by one or more of the user systems 102. In an embodiment, the performance monitoring component 134 can collect data associated with implicit factors, user's actions in quizzes and games, and/or user brow sing behavior to generate the consumption measurements. In an embodiment, performance monitoring module 134 can process the consumption measurements for each content item of a library of content items (e.g., eBooks stored, for example, in memory 138). In an embodiment, the performance monitoring module 134 can generate a matrix of all content items for a particular learner (e.g., a particular user system 102) with the corresponding blending schema and the consumption measurements. In an embodiment, an iterative and incremental loop of improvements can be implemented and informed by the collective matrix of other users who are similar to this particular learner, or of all users. In an embodiment, the enhancements, changes, updates, or modifications identified by the performance monitoring component 134 can be used to inform the authoring process executed by authoring component 122, which in turn improves the consumption process executed by consumption component 128. In an embodiment, this iterative and incremental loop of improvements works to optimize the user experience and learning efficacy.

In some implementations, an author or editor, via a content source system 101, can use the multilingual content management system 120 to combine multilingual texts, graphical illustrations, and audio pronunciations to construct code-switched digital content, such as a bilingual eBook or to add a code-switched caption to a video. In an embodiment, the finished product can be made available to a user via a user system 102 (e.g., an electronic device, such as a smartphone, electronic reader (eReader), tablet, desktop, laptop or other types of connected devices, via a web browser, a mobile app or other types of implementation). Although aspects of the disclosure are discussed with respect to particular types of systems, the benefits of the disclosure may not be limited to eLearning environments and may be applied to other types of systems.

Figure 2A:
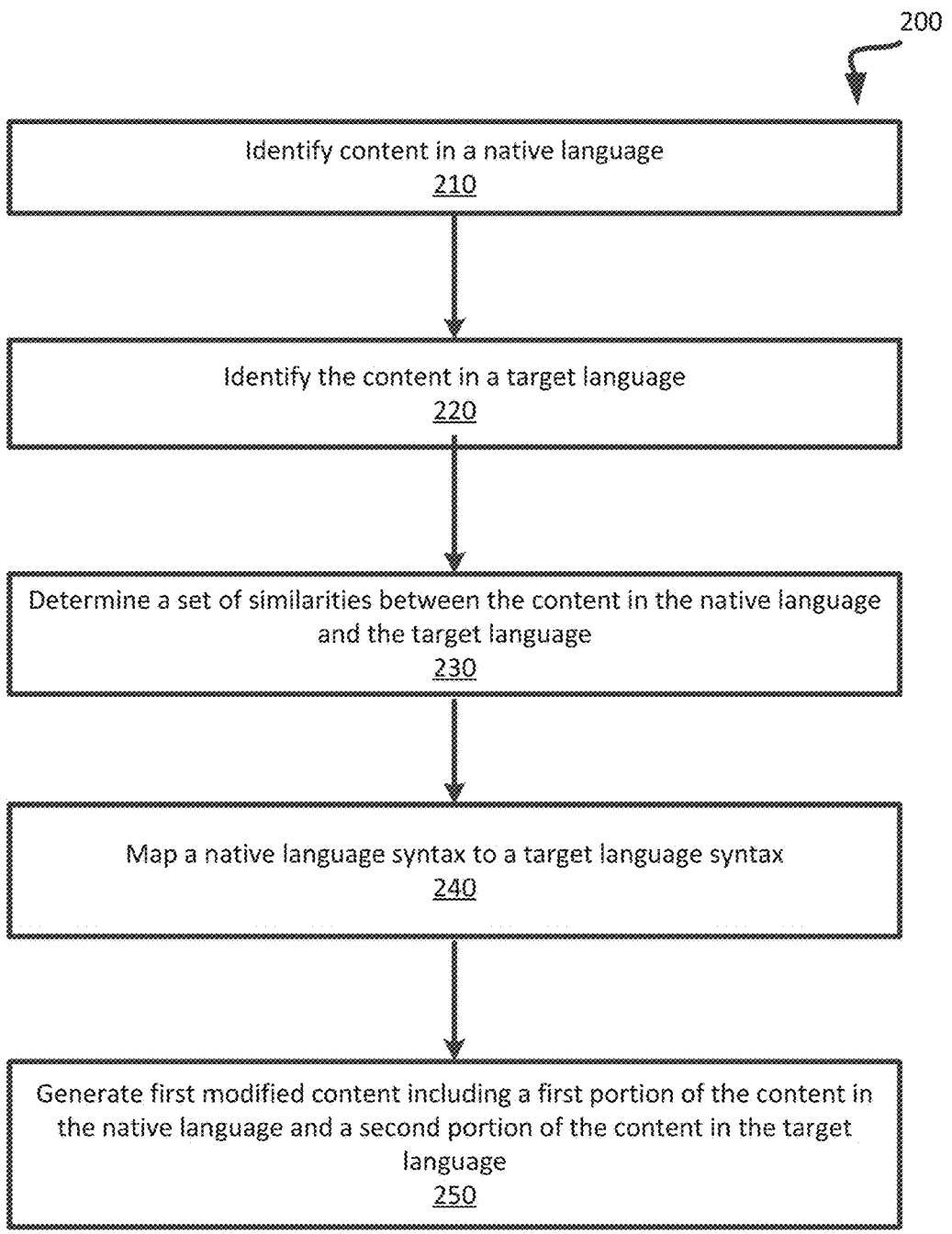
FIGS. 2A-2B are flow diagrams illustrating example embodiments of a multilingual content management process, in accordance with one or more embodiments of the present disclosure.

FIG. 2A depicts a flowchart illustrating example functionality implemented by a multilingual content management system (e.g., multilingual content management system 120 of FIG. 1) to generate blended multilingual content, according to various embodiments of the present disclosure. It is understood that the flowchart of FIG. 2A provides an example of the many different types of functional arrangements that may be employed to implement the operation of the multilingual content management system 120 as described herein. The method 200 of FIG. 2A can be performed by processing logic that comprises hardware (e.g., circuitry, dedicated logic, programmable logic, microcode, etc.), software (e.g., instructions run on a processing device to perform hardware simulation), or a combination thereof. Method 200 may be performed in any order so as to fit the needs of the functionality to be provided. In this regard, the operations of method 200 can be performed simultaneously or in a different order than that depicted.

In an embodiment, the method 200 includes operations to generate blended text in multiple languages (e.g., a native language (L1) and a target language (L2)) for presentation via a graphical user interface. In operation 210, the processing logic identifies content in a native language (L1). In an embodiment, the content in the native language can be received by the processing logic from a source (e.g., content source system 101 of FIG. 1). In an embodiment, the content in the native language can be included in a file received by the processing logic.

In operation 220, the processing logic identifies the content in a target language (L2). In an embodiment, the target language represents a non-native or foreign language which is to be provided to a user (having a level of fluency in the native language) for the purposes of learning the target language. In an embodiment, the target language (L2) can be received by the processing logic from a source (e.g., content source system 101 of FIG. 1) or generated by the processing logic based on the native language (e.g., using translation processing). An example of the content in the native language (L1) and the target language is shown in FIG. 3.

In operation 230, the processing logic determines a set of similarities between content in the native language (L1) and the target language (L2). The set of similarities can include the relationships among words and phrases from L1 and the corresponding relationships among matching words and phrases in L2, representing the correspondence between grammatical structures of the two languages (e.g., relationships between adjectives and nouns, nouns and relative clauses, verbs and adverbs, among others, that exist in both languages). In an embodiment, the combination of parsing and word alignment operations helps identify this correspondence. In an embodiment, the set of identified similarities can serve as thematic grammatical topics, that can both be used in the automatic adjustment of code-switching parameters, and used by learners or educators to focus on certain grammar items or a sequence thereof.

In operation 240, the processing logic mapping a first syntax of the native language to a second syntax of the target language. For example, the syntax for possessive in Spanish (L2) is grammatically correct in English (L1). Therefore, in this example, operation 240 maps English to Spanish syntax as follows: "Mary's home (house)" is mapped to "La casa de Maria (The house of Mary)".

In operation. 250, the processing logic generates first modified content including a first portion of the content in the native language and a second portion of the content in the target language via a display. In an embodiment, the first modified content includes a blended presentation of the content in both the native language and the target language.

In an embodiment, the target language text (L2) can be gradually introduced or blended into the native language text (L1) for display to a user in response to adjustments to the blending rate input via an interaction by the user (e.g., using an incremental slider). For example, a user can select an automatically generated blend of L1 and L2 to display a story from one or more blended options. In an embodiment, the processing logic provides the user with controls with which to interact to change, update, adjust, and select the blending ratio or rate used to generate the multilingual blended content. In an embodiment, the user can select and adjust the blending rate used to blend the L1 and L2 text. Example blending rates and corresponding blending can include:

0% blending rate of L2—The fat man eats chicken and rice

10% blending rate of L2—The fat man come chicken and rice

50% blending rate of L2—The fat man come polio con arroz

100% blending rate of L2—El hombre gordo come polio con arroz

Figure 2B:
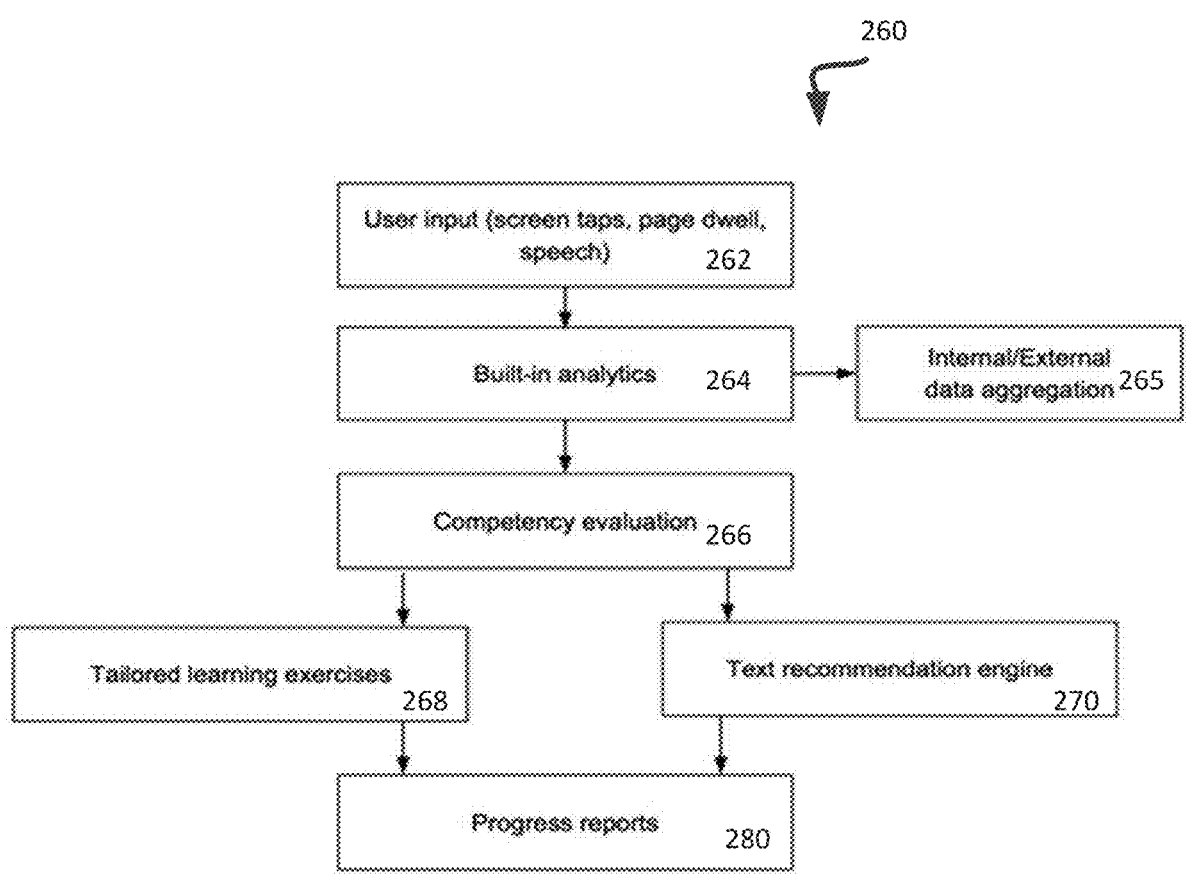

FIG. 2A depicts a diagram illustrating example functionality implemented by a multilingual content management system (e.g., multilingual content management system 120 of FIG. 1) to analyze the consumption of blended content by a user (e.g., a user operating a user system 102 of FIG. 1), according to various embodiments of the present disclosure. It is understood that the flowchart of FIG. 2B provides an example of the many different types of functional arrangements that may be employed to implement the operation of the multilingual content management system 120 as described herein. The method 260 of FIG. 2B can be performed by processing logic that comprises hardware (e.g., circuitry, dedicated logic, programmable logic, microcode, etc.), software (e.g., instructions run on a processing device to perform hardware simulation), or a combination thereof. Method 260 can be performed in any order so as to fit the needs of the functionality to be provided. In this regard, the operations of method 260 can be performed simultaneously or in a different order than that depicted.

In operation 262, the processing logic receives user input (e.g., screen taps, page dwells, speech) associated with blended multilingual content presented to a user via a user system. In an embodiment, the user input may include a selection or adjustment to blending rate used to generate the blended content including L1 and L2 text (the blending ratio of L1 text to L2 text). For example, in operation 262, the processing logic can receive a selection from a user to automatically generate a blend of L1 and L2 according to a blending ration from among multiple blended options. In an embodiment, the processing logic provides the user with controls with which to interact to input changes, updates, adjustments, and selections relating the blending ratio or rate or specific blends of L1 and L2 text.

In operation 264, the processing logic utilizes built-in analytics to analyze the user input, as described in greater detail below. In operation 266, a competency evaluation algorithm is applied to the user input and associated analytics generated by the processing logic. In an embodiment, tailored or customized learning exercises 268 and/or text recommendations (generated by a text recommendation engine 270) are generated based on the application of the competency evaluation algorithm in view of a user's current and projected capabilities. For example, the processing logic can record and interrupt user input at a computing device for the purpose of recommending texts or learning exercises. In operation 280, performance metrics can be compiled into and presented via one or more customizable user progress reports. In an embodiment, the performance metrics can be provided to a machine learning component (e.g., machine learning component 132 of FIG. 1) as training data meant to adjust, modify, improve the blending operations 126 performed by the authoring component (e.g., authoring component 122 of FIG. 1). In operation 265, the data collected and analyzed by the processing logic is aggregated and annotated for use by the multilingual content management system.

According to embodiments of the present disclosure, the multilingual content management system includes processing logic to perform content authoring. In an embodiment, the processing logic can be implemented by the authoring component 122 of FIG. 1. In an embodiment, the authoring component generates multilingual code-switched content that adheres to established linguistic principles which is valuable for researchers in linguistics and educators looking for language-learning content. In an embodiment, the authoring processing of the present disclosure improve upon conventional processes which are manual and individualized. For example, in conventional manual processes for creating bilingual code-switched content, the degree of adhering to the linguistic principles can vary drastically from person to person, even among experts.

Aspects of the present disclosure are operable to provide a mechanism by which certain users (e.g., an author, translator) can author bilingual code-switched content in more than one language. In an embodiment, the bilingual code-switched content is the basis of a learning methodology, herein referred to as "blended learning". In an embodiment, to implement a blended learning methodology, the multilingual content management system utilizes an authoring component which includes one or more natural language processing (NLP) components configured to automatically render the blended multilingual content in a structured format that is suitable for language blending and blended learning methodology.

In an embodiment, the one or more NLP components maintain context for content to be 'language blended' by using one or more of (i) a rule-based code-switching algorithm (e.g., code-switching rules) that identifies syntactic commonalities (structures and phrases) between languages, (ii) a machine learning solution (e.g., based on statistical techniques or neutral networks) trained on bilingual corpora for automatically chunking text and aligning words and phrases, (iii) and a machine learning solution trained on data that is captured from user input/activities via the interface to feed back into the code-switching rules.

In an embodiment, the code-switching algorithm is implemented in a way to assist in learning by providing language learners with a simplified, grammatical native language (L1) text reconstructed in a target language (L2) syntax. In an embodiment, the code-switching algorithm captures the mapping between L1 and L2 in order to show the equivalence between words and a manner to which certain grammatical elements can be transformed from one language to the other (e.g., adjectives can precede nouns in some language while follow them in other languages).

In an embodiment, the one or more SLP components enable the authoring component of the multilingual content management system to generate tailored language blending between the L1 and L2 languages by adjusting code-switching parameters based on one or more of the following: (i) user interaction (e.g., taps, clicks, scrolling, performance on exercises or tests, etc.), metadata and context, (iii) author's expressed preferences and priorities (e.g., a code-switching rule indicating that verbs are to be rendered in L2 and proper nouns are to be rendered in L1 across all blends), and (iv) the collective, aggregated insights from the broader user community's usage patterns, preferences, and outcomes (i.e. what seems to have worked well or not well for users similar to this particular learner).

In an embodiment, to blend sentences, the code-switching processing may be implemented by the authoring component of the multilingual content management system. In an embodiment, the code-switching processing can be applied to two side-by-side parallel text files in a native language (L1) and a target language (L2), as shown in FIG. 3. In an embodiment, a side-by-side parallel corpus format can serve as an input to the authoring component. In an example, the two files can be human-readable.

In an embodiment, as described above with reference to FIG. 1, the authoring component can be configured to perform operations including tokening and preprocessing, word alignment, chunking, and blending. In an embodiment, tokenizing and preprocessing includes splitting sentences into words. In an embodiment, the tokenizing and preprocessing operations ensure correct character encoding for different writing systems and remove any unnecessary punctuation from the text of the input files.

Figures 4A, 4B:
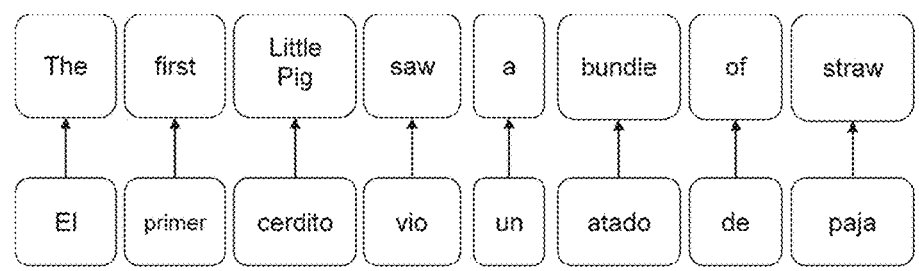
FIG. 4A illustrates a diagram including a word alignment mapping corresponding to example first language native text and second language target text, in accordance with one or more embodiments of the present disclosure.
FIG. 4B illustrates an example chart identifying matching components of first language native text and second language target text, in accordance with one or more embodiments of the present disclosure.

In an example based on the input files in FIG. 3, FIGS. 4A and 4B illustrates an example output of the word alignment processing. As shown, the word alignment processing generates correspondences (as denoted by the "X" in FIG. 4B) between words in L1 and L2. It should be noted that there may not always be a one-to-one alignment between L1 and L2 words and sentences, since some words in either language do not have a corresponding word in the other language, or may have multiple corresponding words.

In an embodiment, chunking operations are executed to generate groups, or chunk, of words, based on the combination of the following factors: 1) the grammar of L1, and 2) the contiguous phrases extracted from word alignment. For the first factor, the chunks can include structures such as noun phrases (NPs), which can be treated grammatically as one unit. This process can be implemented using the output of Parts-of-Speech tagging (POS tagging). It should be noted that not all languages have the same standards of what counts as parts of speech, therefore, the standards for what constitutes an NP chunk will be mainly based on English. In addition, this can be implemented by parsing, which identifies a hierarchy of groupings of words, or by shallow parsing, which is a simplified technique for parsing, commonly used in NLP applications. For the second factor, one important way of using the output of word alignment is extracting a list of contiguous phrase pairs (i.e. a sequence of words in L1 sentences that corresponds to a sequence of words in L2 sentences). An example of the output of the chunking operations is illustrated in FIG. 4C, where matching phrases for each line of text in the L1 and L2 are denoted by grouping in corresponding boxes.

In an embodiment, following the chunking operations, the text is structured in a way that shows the correspondence between words and phrases in L1 to their equivalents in L2, to enable the blending operations. In the blending operations, the output of word alignment and chunking is generated in a format that allows replacing any of L1 chunks with their corresponding L2 chunks. In an embodiment, the presentation of the code-switched material to learners can be represented by the Finite State Machine (FSM), as shown in the example illustrated in FIG. 5. FIG. 5 illustrates the FSM code switching model including possible transitions between the two languages.

In an embodiment, using a FSM code switching model, the transition can be represented as follows: whether the current state (word or chunk) is L1 (in this case English) or L2 (in this case Spanish), the next state can also be either L1 or L2. The presentation of and transitions between L1 and L2 can fall into either of the following categories: 1) randomized: wherein switching is performed between L1 and L2 at any point at random; 2) algorithmically: wherein switching is performed in accordance with a set of transition rules (e.g., switch to L2 every other chunk, etc.); 3) probabilistically: wherein switching is performed in accordance with probabilistic weights that are set for individual states (chunks) and for transitions between states (e.g., setting weights such as P(L2)=0.2 allows controlling how many chunks from L2 will appear in the code switched output, while P(L2|L1)=0.5 allows controlling how many transitions between L1 and L2). In an embodiment, probabilistic factors control the path that runs through states in a way similar to Hidden Markov Model or Viterbi Algorithm, and produces the code switching content. In an embodiment, the code-switching schemas (e.g., randomized, algorithmic, and probabilistic) can be employed individually or in combination. In an embodiment, the blending schema of the used code-switching parameters is generated for each item of code-switched content presented to users for further analysis. In an embodiment, the multilingual content management system keeps track of the code-switching parameters used to generate each item of code-switched content, as well as the corresponding learner performance, so that the optimum parameter settings can be decided accordingly.

FIG. 6 illustrates an example of the code switched content including multiple blends of the L1 and L2 text. It is noted that although five blended combinations are shown in FIG. 6, more than five code switching combinations are possible In an embodiment, the multilingual content management system generates multiple GUIs for display to one or more users (e.g., authors, publishers, learners, educators, etc.) to access features and functionality of the multilingual content management system. In an embodiment, the multilingual content management system generates interfaces to allow authors to enter, submit, or upload input content (e.g., text and other supplementary material). In an embodiment, the multilingual content management system generates interfaces to enable authors to adjust, control, modify, change, or correct the processed content by, for example, adjusting the chunk correspondence, selecting the blending type (e.g., randomized, algorithmic, probabilistic), etc. In an embodiment, the interfaces can display content generated by the authoring component, including the blended multilingual content. In an embodiment, the interfaces illustrated in FIGS. 7A-7E can be accessed and interacted with by one or more systems to enable the features and functionality described above in connection with the authoring component.

Figure 7A:
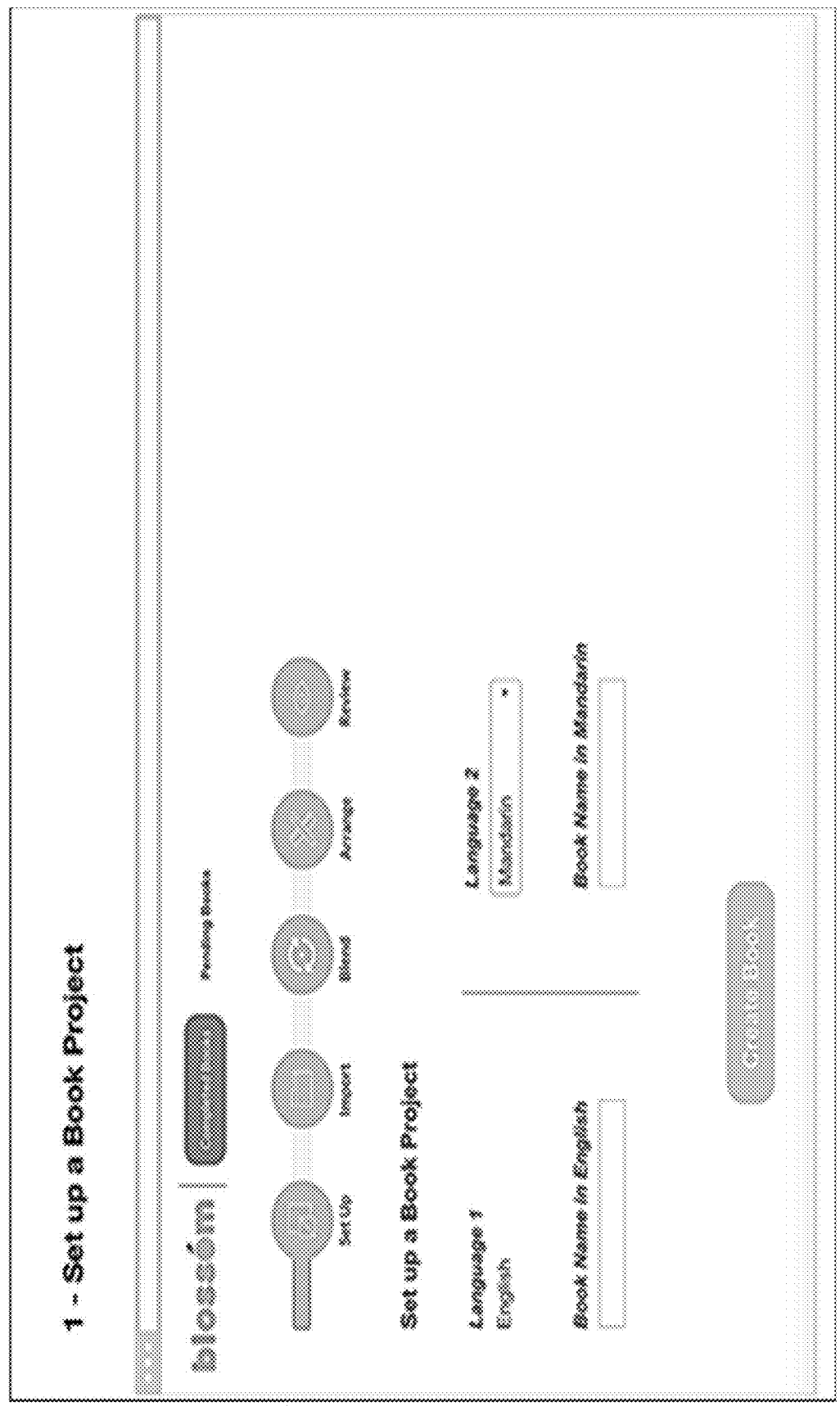
FIGS. 7A-7E illustrate example graphical user interfaces including blended content generated by the multilingual content management system, in accordance with one or more embodiments of the present disclosure.
Figure 7B:
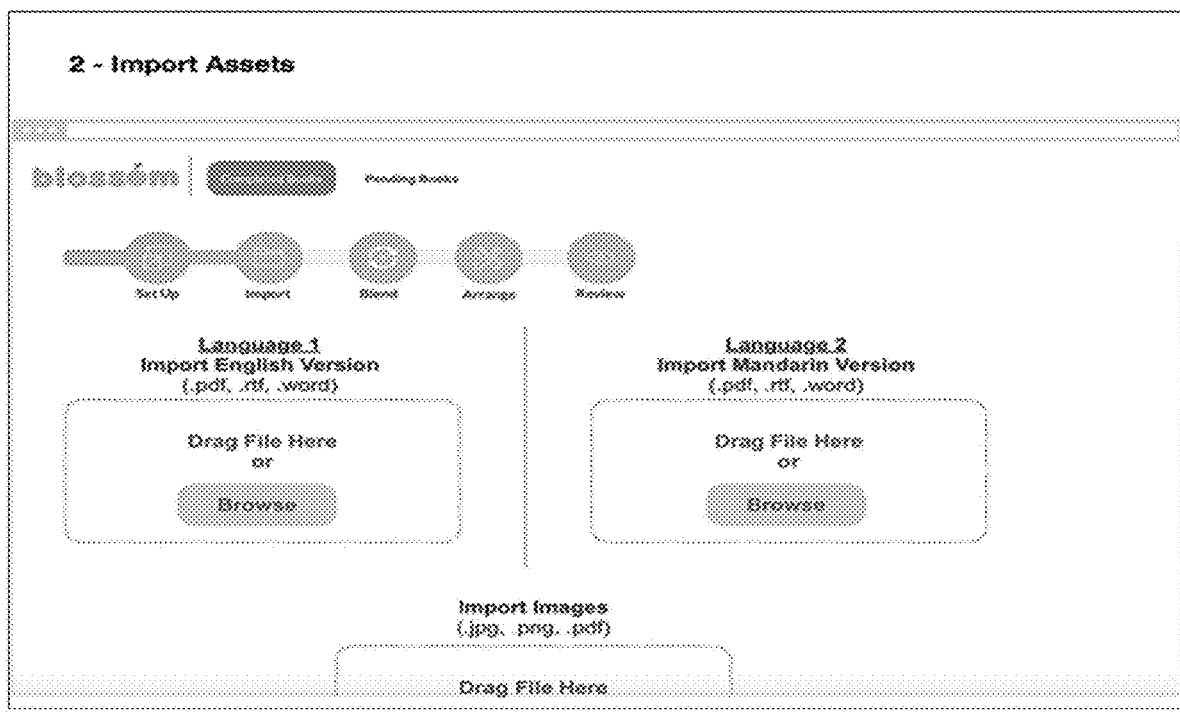

FIG. 7A illustrates an example of an interface a user (e.g., an author) can use to set up a book project that utilizes the multilingual code-switching features described in detail above. In this example, the author may select a native language (L1) (e.g., English) and a target language (L2) (e.g., Mandarin). As shown in FIG. 713, the author can import two versions of content (e.g., a piece of text) respectively in the L1 and L2 languages, in a multitude of file formats, including but not limited to .epub, .pdf, or .word.

Figure 7C:
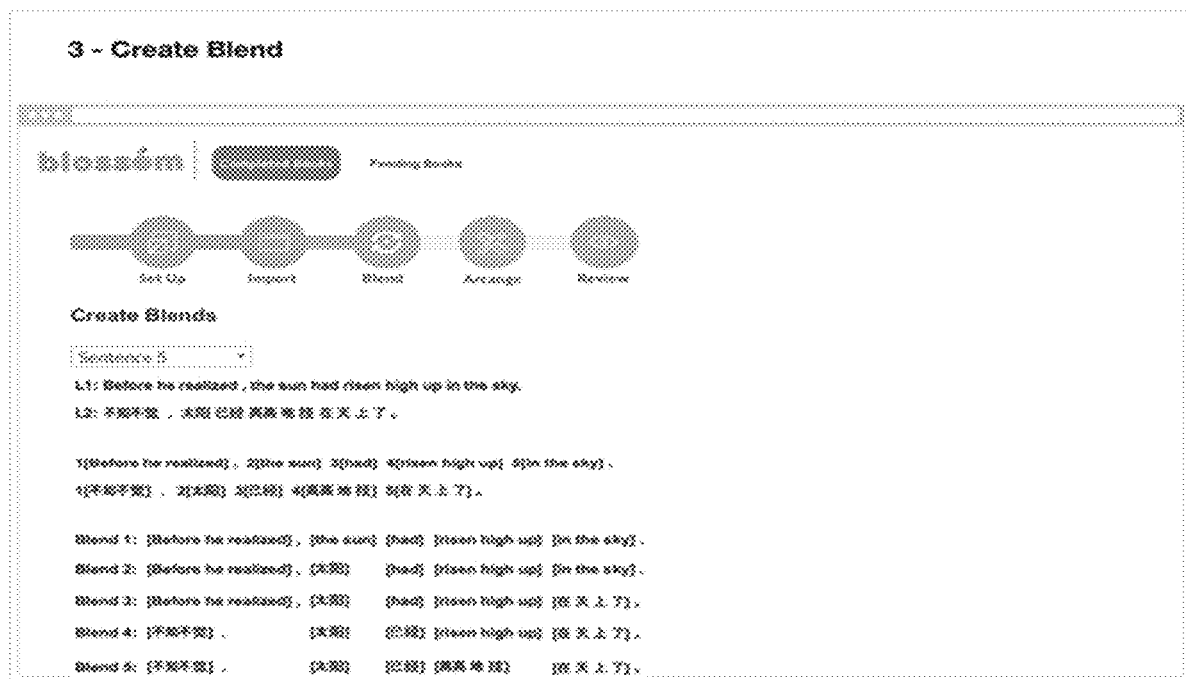
Figure 7D:
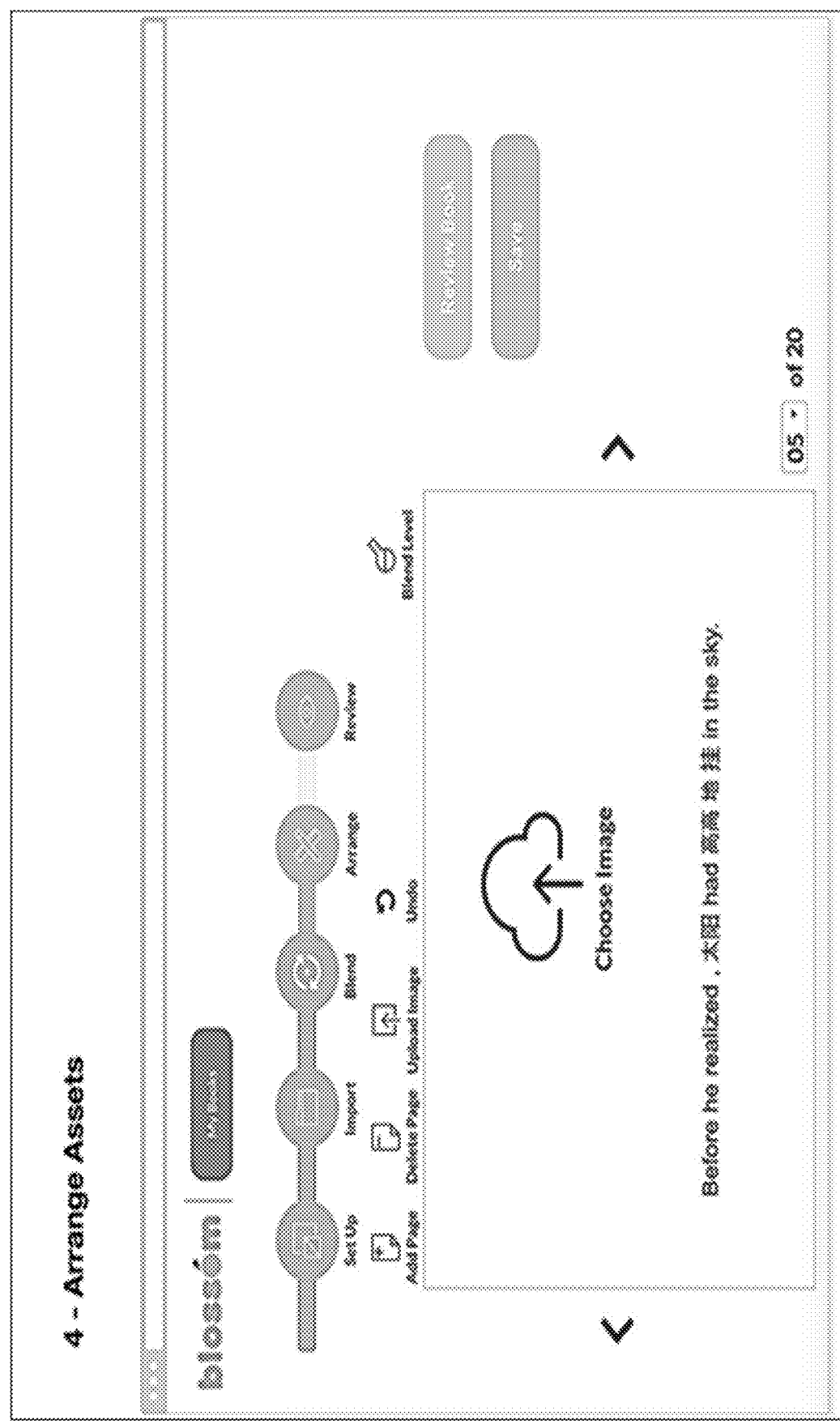

As shown in FIG. 7C, an example interface displays a set of multiple different blends (e.g., generated at multiple different blending levels) of the L1 and L2 text are generated and presented. In the example shown, five blended sentences that combine the linguistic and grammatical features of L1 and L2 are generated to create an imitation of English/Mandarin vernacular. As shown in FIG. 7D an example interface can be accessed by the author to submit, input, or upload additional content (e.g., an image or a video) to supplement the blended text.

Figure 7E:
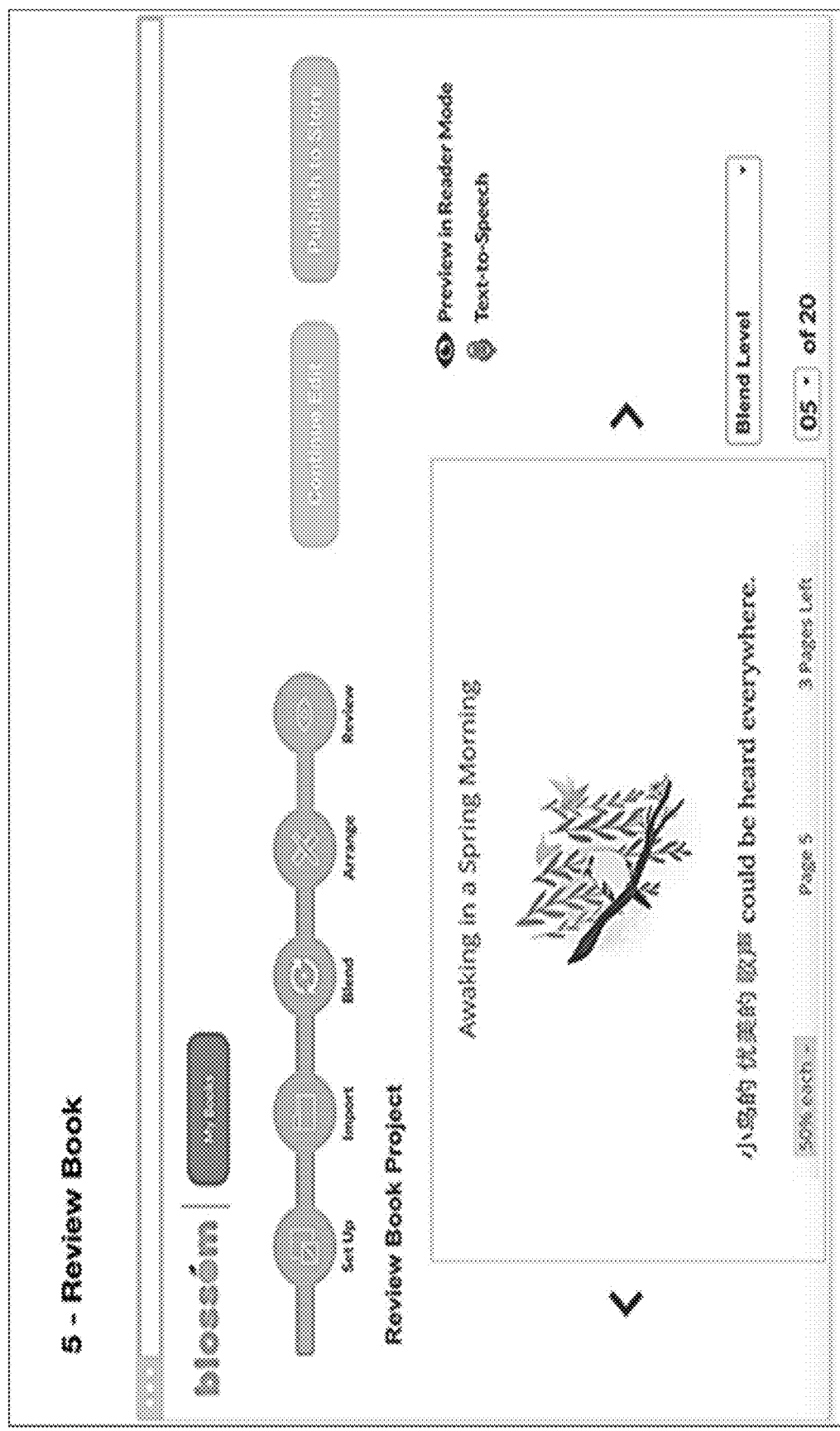

In FIG. 7E, an example interface enables the author to review the constructed content (e.g., a book) on a display associated with the author's computing device. In an embodiment, in response to approval of the draft of the blended content by the user, the content can be stored and published for access by one or core other users (e.g., language learners, educators, etc.) via the multilingual content management system.

Aspects of the disclosure are operable to provide a mechanism by which users (e.g., readers, students, teachers, consumers) have access to the multilingual code-switched content that results from the processes described in detail herein. Users are presented with multilingual code-switched content between the native language (L1) and a target language (L2) which may manifest in, but not limited to, a digital format such as a eBook or closed captions on a video.

In an embodiment, the multilingual content management system provides processes to enable users to (i) select authored language blends (e.g., pre-curated blends), (ii) switch text units between L1 and L2, (iii) activate pronunciation, and (iv) reinforce their L2 mastery by utilizing quizzes, vocabulary lists, and dialogic prompts based on the bilingual code-switched content. Advantageously, the multilingual content management system provides processes that overcome deficiencies in the conventional language learning systems by treats language learning as an evolving organism that corresponds to users' current mastery of the second language.

Figure 8:
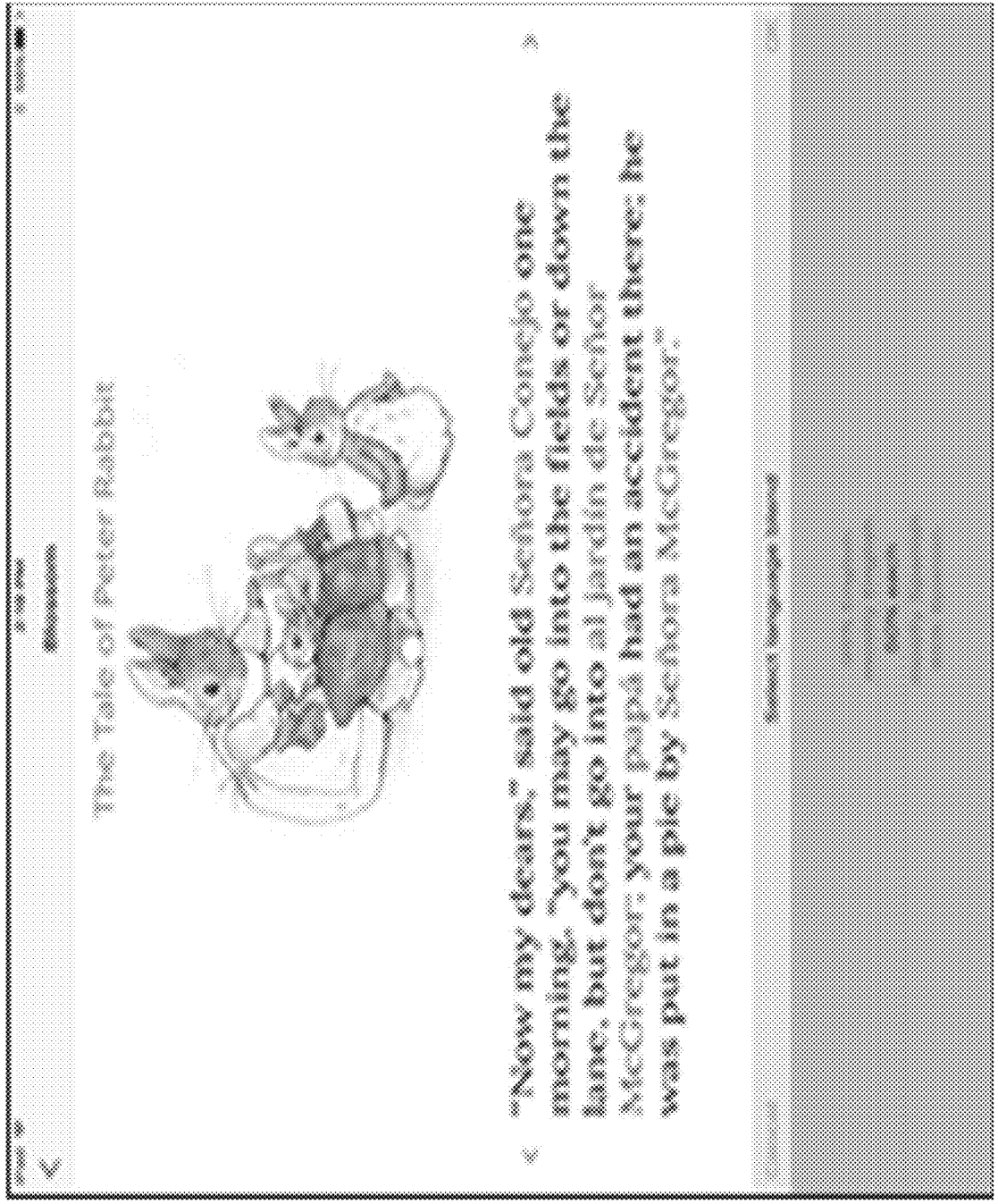
Figure 9:

FIG. 8 illustrates an example of an interface presenting blended multilingual content generated in accordance with the authoring process described in detail above. In this embodiment, the interface presents a user with multilingual code-switched content in an eBook format in response to a selection of an authored language blend. In an embodiment, the user can select the extent or level (e.g., the ratio) of the language blend (e in incremental choices ranging from 95% L1 and 5% L2, to 5% L1 and 95% L2). In another embodiment, a user (e.g., a parent) using a video player utilizing this bilingual code-switched content can incrementally increase the level of language blending for the closed captions.

Although FIG. 8 presents the L1 and L2 blends in prescribed manner, the pre-constructed, authored blends can be altered dynamically by the user and presented to the user in various iterative language blends. In response to a user interaction or gesture (i.e., screen tapping, swiping, clicking, etc.), a user can toggle between a text unit's (word/phrase/chunk) L1 and L2 versions as many times as desired by repeatedly tapping the same text unit. In one embodiment, the word "beautiful" as displayed on the screen in Chinese in FIG. 9 may be dynamically changed by the user between L1 and L2 (e.g., by a quick tap).

In addition to switching text units between L1 and L2, a user can have the text pronounced in the displayed language blend. In one embodiment, a user can interact with a text unit (e.g., tap and hold down a text unit for a duration exceeding a predetermined threshold amount of time) and have the selected text pronounced in the language it is displayed. FIG. 10 illustrates a selection of an example text unit from an eBook including multilingual blended content to cause an audio pronunciation of the selected text unit (as denoted by the broadcast or radio bubble shown in FIG. 10).

Furthermore, as shown in FIG. 10, a user can select a button on the display (e.g., the "Read aloud" button) to cause the entire sentence/passage/paragraph/chapter/book of text to be read aloud in the displayed L1:L2 blend. In an embodiment, if the user changes the L1:L2 blend as discussed above, the audio pronunciation changes accordingly to read aloud the new blended text that is displayed.

According to embodiments, the multilingual content management system can generate one or more tasks, drills, tests, etc. to track, monitor, aid, reinforce, and determine a user's progress associated with learning the target language (L2). In an embodiment, the multilingual content management system allows users to (a) view dialogic prompts, (b) create a personal L2 vocabulary inventory, and (c) complete educational exercises, such as quizzes, interactive games, etc.

In an embodiment, the multilingual content management system provides for dialogic reading (e.g., the process between two readers switching roles between storyteller and active listener while interacting with a book). In an embodiment, users can activate a dialogic prompt configured to facilitate dialogue between readers (e.g., a parent and child); and are evidenced to be an engaging and interactive way to be exposed to L2 vocabulary within substantial context. In one embodiment, a parent can select an icon corresponding to a pop-up dialog box on certain pages generated by the multilingual content management system. In response to the selection of the icon (e.g., pressing the touch screen), the dialog box opens up and presents a dialogic prompt asking relevant questions to reinforce the content. For example, while reading the story, The Tale of Peter Rabbit in any of the L1:L2 blends, parents can interact with an icon for a pop-up dialog box on certain pages. In response to an interaction, a dialog box opens up and presents a dialogic prompt such as, "Why was Peter Rabbit unwell the evening he returned home?" or "Can you remember a time when you were being naughty?"

In an embodiment, the dialogic box can display a variety of prompts depending on the context and reader's objective. The selection of prompts for display in the boxes cant be flexibly adjusted to a user's chosen settings. These prompts are made available in numerous languages including, for example, English, Spanish, and Chinese. In an embodiment, the dialogic prompts can be generated and stored by the multilingual content management system, provided by a content source system, or a combination thereof.

In an embodiment, as users progress their language learning towards target language (L2) comprehension, users can be provided with an option to self-curate a personal L2 vocabulary inventory by tapping words, or selecting a highlighted portion of the audio-visual content. Users can revisit their curated vocabulary inventory frequently to fortify their L2 comprehension.

In some implementations, the multilingual content management system generates educational exercises, such as quizzes, interactive games, and other evaluative instruments. In an embodiment, based on metadata from in-app tracking of user interaction and user competency, tailored exercises are created from proprietary templates. The multilingual content management system prioritizes the content made into exercises by evaluating a number of factors including, but not limited to, the user's action (e.g., frequency of code-switching), the users' performance on related exercises, etc.

In an embodiment, the multilingual content management system executes the code-switching processes to the code-switched content to a learner, or viewer, or reader, in a manner that is customized in accordance with a user's actual usage and is presented in an enjoyable and consumable manner. In an embodiment, the multilingual content management system is configured to source information and data from one or more third parties (e.g., experts such as linguists and educators, lay persons, etc.). In an embodiment, the multilingual content management system provides a content consumption setup process where an individual is presented with code-switched material generated through any or a combinations of the parameters (e.g., the authoring process described above) and can switch language chunks between L1 and L2 (e.g., the consumption process described above). Advantageously, crowd-sourcing the aforementioned data from multiple different sources can enable the creation of many variations of how two languages are blended.

In an embodiment, the multilingual content management system utilizes statistical and analytical methods to determine an optimized suitable version for each individual consumption based on one or more factors (e.g., what is the user using the content for, a user's current command of the second language, a user's personal preferences such as a preferred dialectical origin) to present each user with multilingual code-switched content that is based on factors associated with a group of persons that are similar to the particular user.

In an embodiment, the multilingual content management system employs NLP mechanisms including word alignment, language segmentation (e.g., chunking), and language blending for the use of bilingual code-switch content. In an embodiment, the multilingual content management system collects information and constructs a database to guide and improve NLP outputs. According to one embodiment, the database can contain a large number of language blends and user usage history for training the authoring process and use the NLP mechanisms to present users from a same dialectical group with a language blend customized to optimize the language learning process. In an embodiment, the database can include one or more different kinds of annotations. For example, the database may include information about what parts of speech units are in a given sentence, where each unit is located within a sentence, what context the units are in, and how much of the sentence is necessary to chunk into an appropriate text unit to recreate context. The database may be of any form or format. Other information may also be collected and included in the database.

The database may be constructed through the use of the elements generated in connection with execution of the consumption process described above. The bilingual code-switched content can be consumed over a public network, such as the Internet, or it may be, consumed on private networks, or it may be consumed in other environments, such as on stand-alone machines.

In an embodiment, consumption of the multilingual code-switched content by one or more users generates feedback (e.g., learner performance and interest measurements) that can be used by the multilingual content management system to adaptively present improved or optimized language blends. In an embodiment, the multilingual content management system collects data relating to each user input cross-referenced with user background and usage history, to generate a 'crowd-favored' or 'crowd-sourced' language blend.

In an embodiment, the multilingual content management system includes a performance monitoring component (e.g., performance monitoring component 134 of FIG. 1) to track user performance data. In an ent, the performance monitoring component can generate and provide quizzes or learner tasks configured to measure an extent of learning achieved. In addition, the performance monitoring component can track user interactions with the system, by recording factors such as, but not limited to, the following example factors: materials consumed; completion time of tasks and duration for each interaction with the system; taps, clicks, and other page navigation actions; and actions to skip or dwell on certain parts of the material. The recorded tasks, together with the learning outcomes and achievements, can be used to determine a level of interest and performance of one or more users in certain aspects of the material, which signals either special difficulty, or an important learning milestone, particularly when aggregated across a certain community of learners.

In an embodiment, the results of this data collection and analysis can be represented as discrete outcomes. The outcomes can correspond to a number of factors in the learning process, about both the users themselves, and about the material the users were presented with, and the learning parameter settings (e.g., blending levels, code-switching rules, etc.) that are associated with higher achievement and interest. In an embodiment, the multilingual content management system can adjust the learning parameters as a machine learning problem, where the actual learning outcomes of learners are fed into the system, together with their corresponding features about the learner and the code-switching parameters, and the system predicts the outcomes given any settings, allowing optimization of the settings for each learner of a community of learners based on previous results.

TABLE 1

| Schema Type | Schema Details | Learning Performance |
|---|---|---|
| Randomized | None | 78% |
| Algorithmic | {Every Other Chunk} | 55% |
| Probabilistic | {L2: 0.2, L2/L1: 0.5} | 85% |

In an embodiment, table 1 above illustrates features and characteristics associated with a user (e.g., a learner) that is collected such as dialectical background, geographical information, and materials consumed. Other learners with similar features and characteristics can also have an associated learning performance table as seen above.

In an embodiment, the multilingual content management system can include a machine learning component (e.g., machine learning component 132 of FIG. 1) to track, monitor, and learning performances of all characteristically similar learners which are weighted and averaged across the different schema types. For example, users learning English (L2) from Spain who are described to be native Spanish speakers with the Andalusian dialect, with a total population size of n=10, can collectively perform within the multilingual content management system in the following example manner:

Randomized schema: 67%
Algorithmic schema: 54%
Probabilistic schema: 85%

In one embodiment, based on information generated by the machine learning component, the multilingual content management system can present all Andalusian Spanish speakers with bilingual code-switched content that is blended using a probabilistic schema. In an example, following days of usage, the same group of Andalusian Spanish speakers can exhibit a poor performance with the probabilistic schema, and the learning performance for the probabilistic schema may drop to 30%. In this case, the multilingual content management system can present all Andalusian Spanish speakers with the randomized schema since it now has the highest rated learning performance indicator of 67%. This way, the continual input collection from our Andalusian Spanish learners has an iterative effect on the presentation of blended content for the Andalusian Spanish learners.

In another example, an additional five Andalusian Spanish speakers begin to consume bilingual code-switched content on this system; increasing the total population size to n=15. The inclusion of inputs from the new Andalusian Spanish speakers may alter the learning performance indicator in the following manner:

Randomized schema: 65%
Algorithmic schema: 66%
Probabilistic schema: 54%

As a result, the multilingual content management system can present all Andalusian Spanish speakers with bilingual code-switched content that adheres to the algorithmic schema.

In addition, the Andalusian Spanish speakers may perform outstandingly with noun phrases, but may perform poorly with adjective clauses. In this case, regardless of the schema being used to blend the bilingual code-switched content, the multilingual content management system can, on average, present Andalusian Spanish speakers with language blends that improve their grasp of L2 adjective clauses. In some contexts, the path to improvement may be to increase a frequency of the presentation of adjective clauses in L2; and in other contexts, it may be to decrease a frequency of the presentation of adjectives clauses in L2 at first, and then, gradually increase the frequency of L2 adjective clauses in view of an analysis of the rate of improvement.

In another example, the multilingual content management system can determine the L2 competencies of the fifteen native Andalusian Spanish speakers varies among individuals. In this case, the multilingual content management system can perform a deeper analysis using explicit and implicit factors (e.g., a frequency of L1:L2 chunk switching, authored blend selections, audio playback, performance on questionnaires, etc.). After the analysis, the multilingual content management system can determine how to create more specific sub-groups of learners and display a tailored blend for each. For example, the multilingual content management system can determine an optimized presentation of 20% L2 blend for three of the fifteen Andalusian learners (i.e., novice group), a 50% L2 blend for ten of the fifteen learners (i.e. intermediate group), and 95% L2 blend for the remaining learners (i.e. advanced group).

Furthermore, the multilingual content management system can analyze performance monitoring data on individualized basis, creating a more tailored learning environment for learners. For example, if Learner A from the aforementioned intermediate group is underperforming compared to her cohort with regards to Verb Tenses, then Learner A can, in one embodiment, initially receive less Verb Tense chunks in L2. In this example, the multilingual content management system can gradually increase the frequency of L2 Verb Tense for Learner A. The rate of improvement for Learner A is analyzed by the multilingual content management system can, which can be used to determine the rate in which to increase the presentation of Verb Tenses in L2.

Figure 11A:
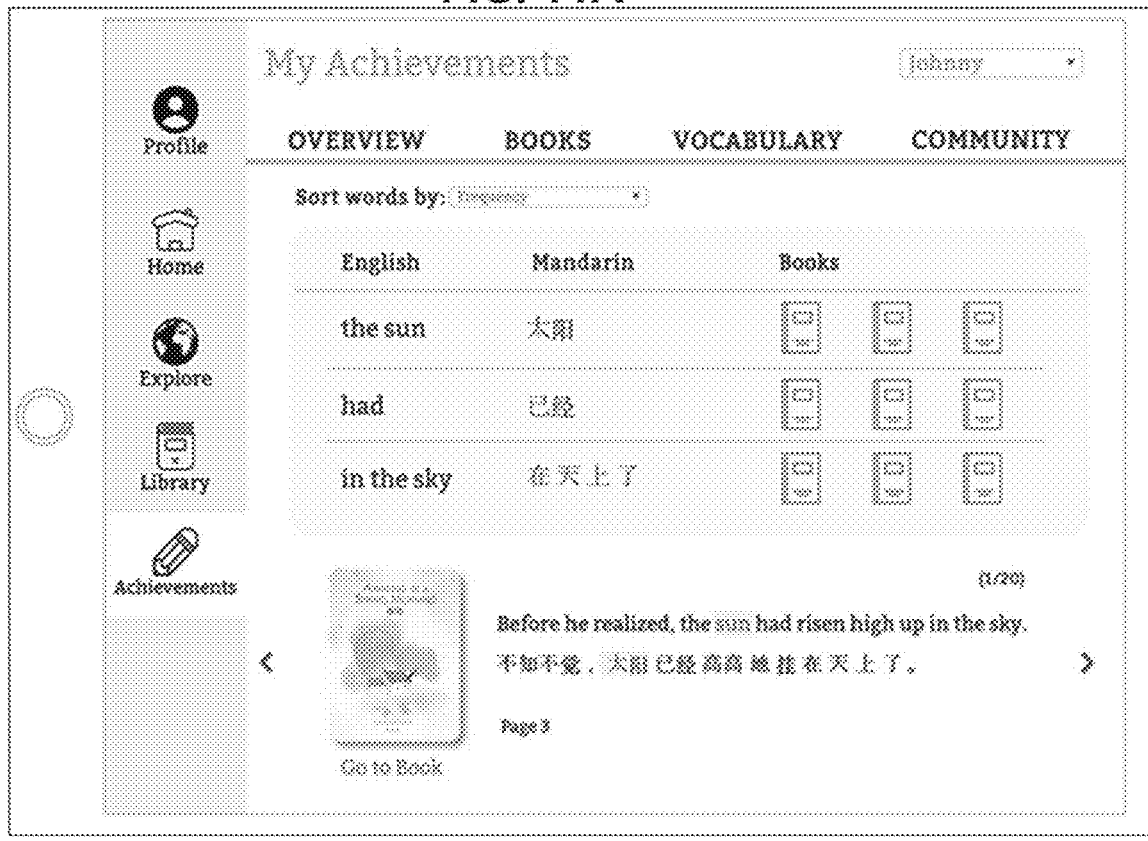
FIGS. 11A and 11B illustrate example graphical user interfaces relating to tracking processing of a user, in accordance with one or more embodiments of the present disclosure.
Figure 11B:

FIGS. 11A and 11B illustrate example interfaces that can used to track the processing and progress of a user (e.g., a language learner). For example, parents may receive a developmental score that allows them to track their child's L2 proficiency over time. A speech pathologist may use the analytics or interactions recorded by the system to pinpoint specific developmental issues children experience bilingual households. In another example, a researcher in linguistics or developmental psychology may utilize the anonymized corpus of parent-child speech for various scientific research endeavors.

In an embodiment, the multilingual content management system tracks on-screen user interaction s page duration, responses to language-learning games, and records and categorizes user speech (distinguishing parent vs. child speech) for an in-app evaluation of competency. In an embodiment, the multilingual content management system aligns and correlates instances of user interactions as registered through the touch-screen user interface, to their speech as recorded by the tablet device, and vice versa. User speech is compared to a model of L2 production using linguistically relevant metrics including, but not limited to, prosody, speech rate, and phonetic production. Then, the multilingual content management system evaluates differences between user speech input and model and generates a detailed competency report usable by parents, researchers, or other speech professionals.

Figure 12A:
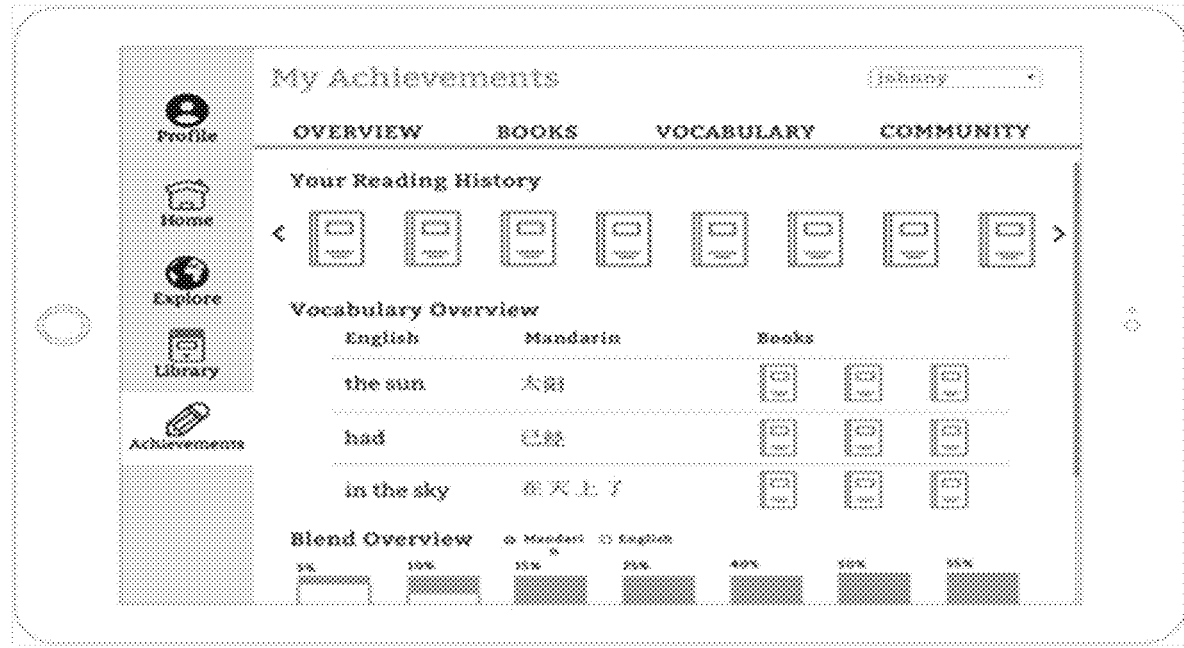
FIGS. 12A and 12B illustrate example charts associated with a user's progress relating to one or more competency metrics in relation to a competency evaluation, in accordance with one or more embodiments of the present disclosure.
Figure 12B:
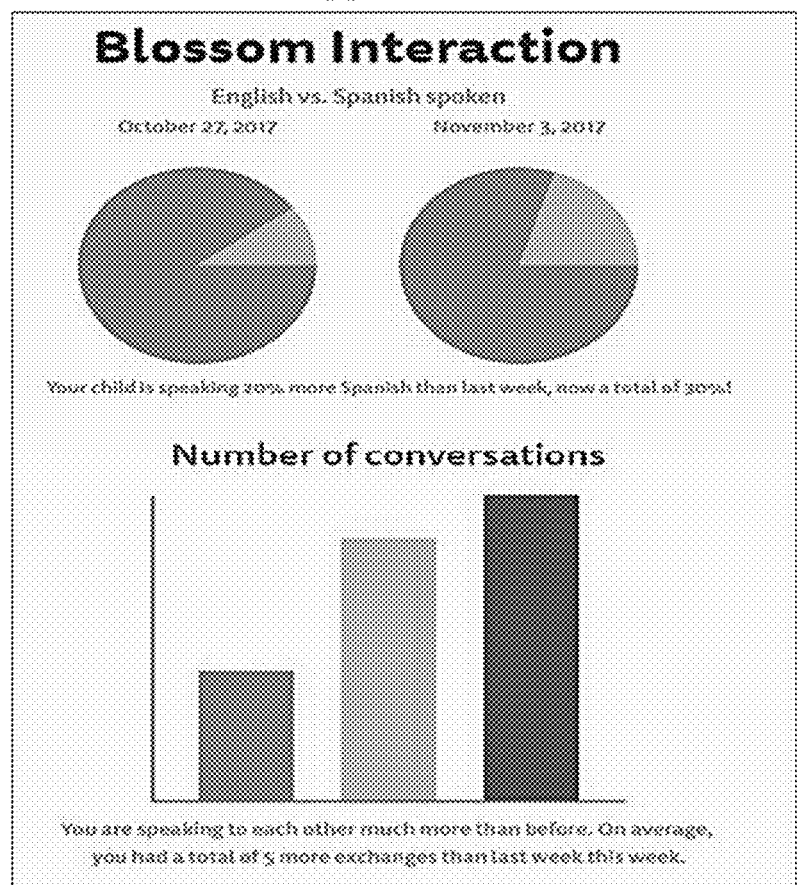

FIGS. 12A and 12B depict example visual charts generated by the multilingual content management system, where the visual charts illustrate user progress over time using competency metrics in relation to the competency evaluation. In an embodiment, Interaction with the multilingual content management system is recorded and annotated to create a spoken bilingual corpus of parent-child speech for various machine-learning applications.

FIG. 13 illustrates an example interface generated by the multilingual content management system that can be used to record a language learner's pronunciation of certain words presented in a target language. In an embodiment, the multilingual co stent management system evaluates whether the learner has improved over time based on the recorded pronunciation data. In an embodiment, a graph representing the level of competency in the target language can be generated and displayed.

Figures 14A, 14B:
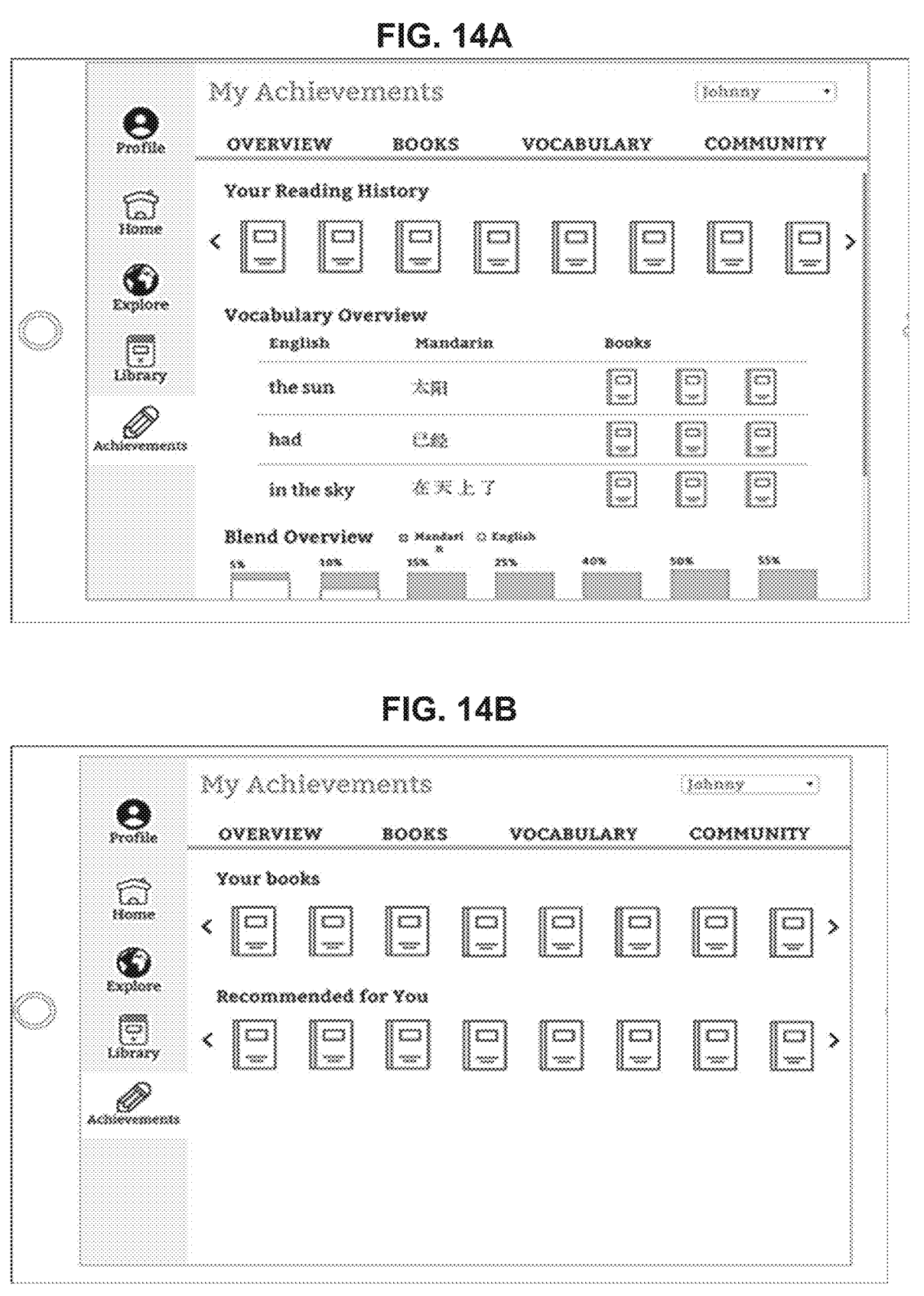

FIG. 14A depicts an example interface generated by the multilingual content management system and presented to one or more users reviewing their overall progress with the multilingual content management system. In an embodiment, the multilingual content management system analyzes user behaviors and informs users of their reading history, encountered vocabulary, and overall blend progression.

As shown in FIG. 14B, the multilingual content management system can generate an interface including a first row labeled 'Your books' identifying a list of books the user has read, sorted by the most frequently accessed. In the example shown, the second row labeled 'Recommended for You' includes a list of recommended content for a language learner to consume based on the multilingual content management system's tracking of user interaction and competency.

Figure 14C:
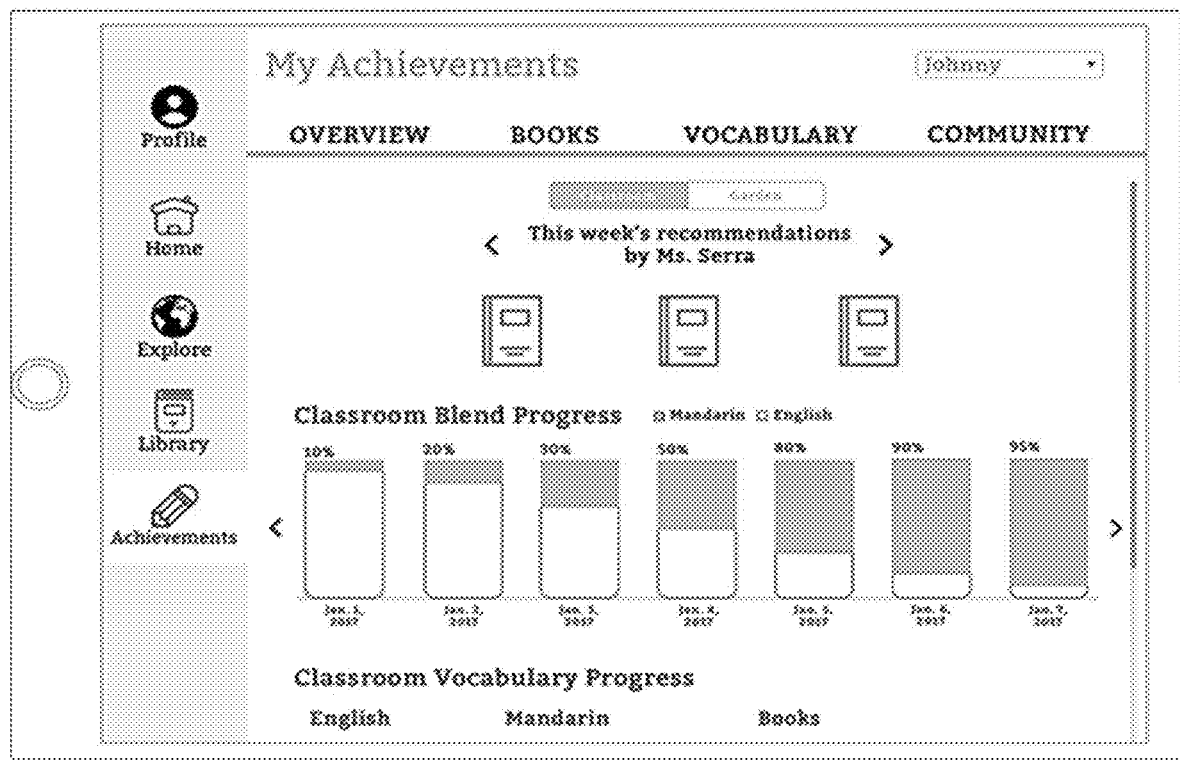

FIG. 14C depicts an example interface generated by the multilingual content management system and presented to users within a classroom and/or the aggregate community of subscribers/users of the system. For example, a teacher of the language learner may guide students through learning a second language by curating books for the class to read. The same type of curation may occur on a system wide scale where the multilingual content management system recommends books to read to a multitude of user demographics. In an embodiment, blend progression graphs can also be generated and displayed to indicate a progress of the classroom or community as a whole with respect to learning the target language (L2).

Figure 15:
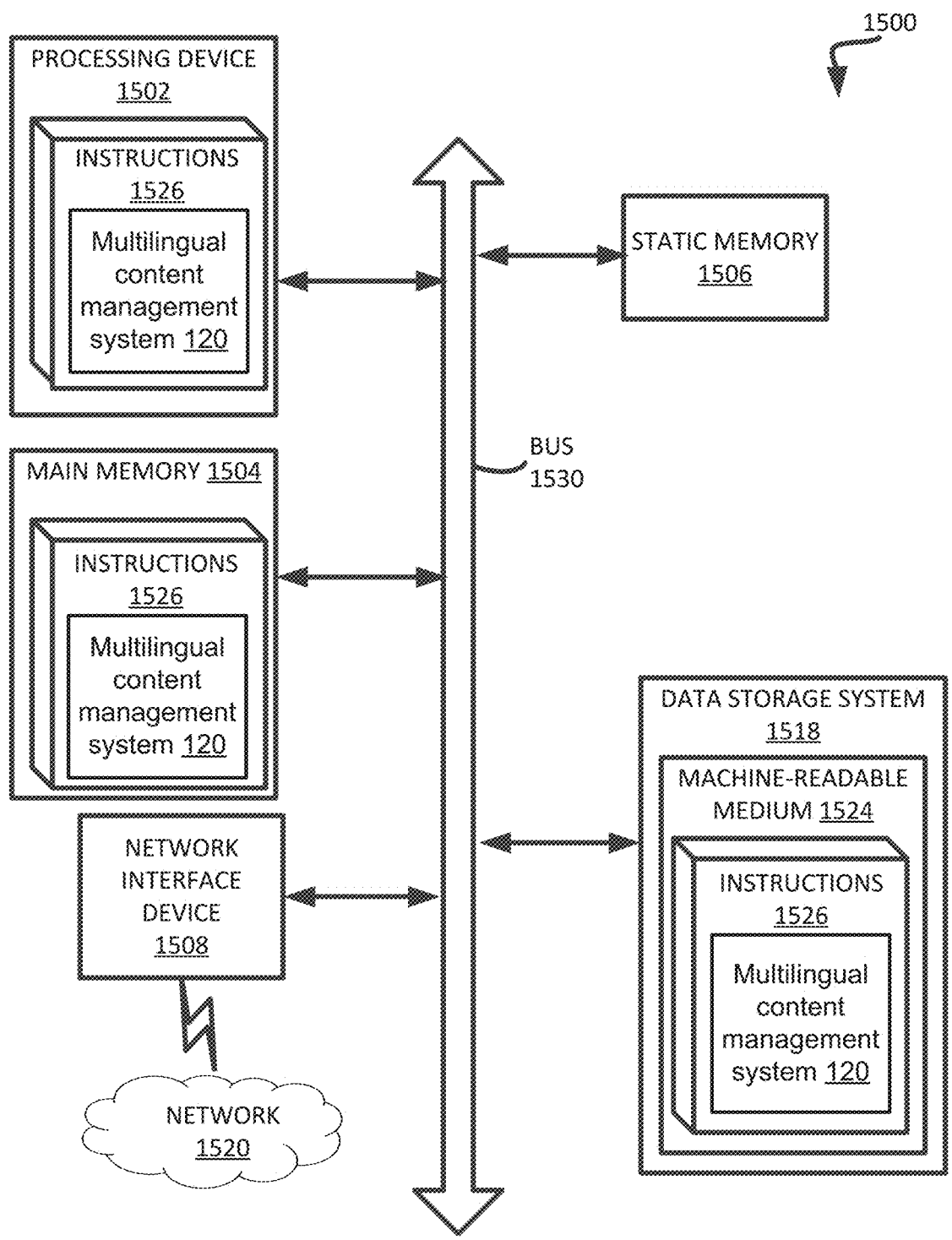
FIG. 15 is a schematic block diagram that provides an example illustration of a computing environment executing instructions relating to a multilingual content management system, in accordance with one or more embodiments of the present disclosure.

FIG. 15 illustrates a diagrammatic representation of a machine in the example form of a computer system 1500 including a set of instructions executable by a multilingual content management system (e.g., multilingual content management system 120 of FIG. 1) to cause the system to perform any one or more of the methodologies discussed herein. In one embodiment, the multilingual content management system 120 can include instructions to enable execution of the processes and corresponding components shown and described in connection with FIGS. 1-14.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 1500 includes a processing device (processor) 1502, a main memory 1504 (e.g., read-only memory (ROM), flash memory, dynamic random access memory (DRAM) such as synchronous DRAM (SDRAM)), a static memory 1506 (e.g., flash memory, static random access memory (SRAM)), and a data storage device 1518, which communicate with each other via a bus 1530.

Processing device 1502 represents one or more general-purpose processing devices such as a microprocessor, central processing unit, or the like. More particularly, the processing device 1502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1502 may also be one or more special-purpose processing devices such as an application specific integrated circuit (ASIC), a field programmable gate array (FPGA), a digital signal processor (DSP), network processor, or the like. In various implementations of the present disclosure, the processing device 1502 is configured to execute instructions for the multilingual content management system 120 for performing the operations and processes described herein.

The computer system 1500 may further include a network interface device 1508. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), and a signal generation device 1516 (e.g., a speaker).

The data storage device 1518 may include a computer-readable medium 1528 on which is stored one or more sets of instructions of the multilingual content management system 120 embodying any one or more of the methodologies or functions described herein. The instructions may also reside, completely or at least partially, within the main memory 1504 and/or within processing logic 1526 of the processing device 1502 during execution thereof by the computer system 1500, the main memory 1504 and the processing device 1502 also constituting computer-readable media.

The instructions may further be transmitted or received over a network 1520 via the network interface device 1508. While the computer-readable storage medium 1528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "storing", "executing", "extracting", "comparing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, by a processing device, first content in a native language;
   identifying second content in a target language that matches the first content in the native language;
   determining, by a machine learning process, a mapping comprising a set of similarities between the first content in the native language and the second content in the target language;
   generating, at a first time, based on the set of similarities and a first schema, first modified content comprising a first ratio of a first portion of the first content in the native language to a second portion of the second content in the target language;
   displaying the first modified content to a user system;
   generating, by the machine learning process, based on training data comprising one or more performance metrics associated with the first modified content and information associated with a group of users comprising a user of the user system, an adjustment to the first ratio according to the first schema;
   generating, at a second time, based on the adjustment, second modified content comprising a second ratio of a third portion of the first content in the native language to a fourth portion of the second content in the target language;
   collecting additional performance metrics associated with the group of users relating to the second modified content; and
   identifying a second schema in view of the additional performance metrics.

2. The method of claim 1, further comprising:
   displaying, to the user system, a plurality of modified content options, wherein each of the plurality of modified content options comprises a different ratio of the first portion of the first content in the native language to the second portion of the second content in the target language; and
   receiving, from the user system, a selection of one of the plurality of modified content options.

3. The method of claim 1, further comprising:
   mapping a first syntax corresponding to the first content in the native language to a second syntax corresponding to the second content in the target language.

4. The method of claim 1, wherein determining the set of similarities comprises identifying a first group of words of the first content in the native language corresponding to a second group of words of the second content in the target language.

5. The method of claim 1, wherein the first modified content comprises the first ratio of the first portion of the first content in the native language to the second portion of the second content in the target language, wherein in the first ratio is determined based on applying the first schema to the first content and the second content.

6. The method of claim 1, further comprising:
   generating, based on the set of similarities, second modified content comprising a second ratio of the first content in the native language to the second content in the target language, wherein the first ratio is not equal to the second ratio.

7. The method of claim 1, wherein the first modified content is generated in accordance with the first schema comprising a randomized blending schema, an algorithmic blending schema, or a probabilistic blending schema.

8. The method of claim 7, further comprising:
   monitoring an interaction by the user system with the first modified content;
   determining performance data associated with the interaction; and
   changing, in view of the performance data, one of the first schema or the first ratio.

9. A system comprising:
   a processing device; and
   a memory to store computer-executable instructions that, if executed, cause the processing device to perform operations comprising:
      identifying, by a machine learning process, an alignment of a first set of words in a first language to a second set of words in a second language;
      selecting, by the machine learning process, a first blending schema based on information associated with a user of a user system, wherein the first blending schema comprises at least one of a randomized blending schema, an algorithmic blending schema, or a probabilistic blending schema;
      generating, based on the alignment and a first blending ratio associated with the first blending schema, first blended content comprising a first portion of the first set of words and a second portion of the second set of words;
      displaying the first blended content to the user system;
      collecting performance metrics associated with interactions with the first blended content by a group of users comprising the user; and
      identifying a second blending schema in view of the performance metrics.

10. The system of claim 9, wherein the operations further comprise:
    generating, based on the alignment and a second blending ratio corresponding to the second blending schema, second blended content comprising a third portion of the first set of words and a fourth portion of the second set of words; and
    displaying the second blended content to the user system.

11. The system of claim 9, wherein the operations further comprise:
    establishing the second blending schema based at least in part on the performance metrics.

12. The system of claim 9, wherein the operations further comprise:
    receiving an input from the user system based on an interaction with the first blended content; and
    determining a code-switching parameter based at least in part on the input.

13. A non-transitory computer-readable storage device storing computer-executable instructions that, if executed by a processing device, cause the processing device to:
    identify first content in a first language;
    identify second content in a second language that matches the first content in the first language;

determine, by a machine learning process, a mapping comprising a set of similarities between the first content in the first language and the second content in the second language;

generate, at a first time, based on the set of similarities and a first schema, first blended content comprising a first ratio of a first portion of the first content in the first language to a second portion of the second content in the second language;

generate, by the machine learning process, based on training data comprising one or more performance metrics associated with the first blended content and information associated with a group of users, an adjustment to the first ratio according to the first schema;

generate, at a second time, based on the adjustment, second blended content comprising a second ratio of a third portion of the first content in the first language to a fourth portion of the second content in the second language;

collect additional performance metrics associated with the group of users relating to the second blended content; and identify a second schema in view of the additional performance metrics.

14. The non-transitory computer-readable storage device of claim 13, the processing device to map a first syntax corresponding to the first content in the first language to a second syntax corresponding to the second content in the second language.

15. The non-transitory computer-readable storage device of claim 13, wherein the set of similarities comprises a first group of words of the first content in the first language corresponding to a second group of words of the second content in the second language.

16. The non-transitory computer-readable storage device of claim 13, wherein determining the set of similarities comprises identifying a first group of words of the first content in the first language corresponding to a second group of words of the second content in the second language.

17. The non-transitory computer-readable storage device of claim 13, wherein the first blended content comprises the first ratio of the first portion of the first content in the first language to the second portion of the second content in the second language, wherein in the first ratio is determined based on applying the first schema to the first content and the second content.

18. The non-transitory computer-readable storage device of claim 13, the processing device to generate, based on the set of similarities, second blended content comprising a second ratio of the first content in the first language to the second content in the second language, wherein the first ratio is not equal to the second ratio.

19. The non-transitory computer-readable storage device of claim 13, wherein the first blended content is generated in accordance with the first schema comprising at least one of a randomized blending type, an algorithmic blending type, or a probabilistic blending type.

20. The non-transitory computer-readable storage device of claim 13, the processing device to:
monitor an interaction by a user system with the first blended content;
determine performance data associated with the interaction; and
change, at least in part on the performance data, the first schema to the second schema.

* * * * *